(12) United States Patent
Tanaka et al.

(10) Patent No.: US 9,021,224 B2
(45) Date of Patent: Apr. 28, 2015

(54) METHOD AND APPARATUS FOR ENHANCED COMPUTER SECURITY

(75) Inventors: Daisuke Tanaka, Odawara (JP); Keishi Tamura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 837 days.

(21) Appl. No.: 13/146,627

(22) PCT Filed: Jun. 30, 2011

(86) PCT No.: PCT/JP2011/003765
§ 371 (c)(1), (2), (4) Date: Jul. 27, 2011

(87) PCT Pub. No.: WO2013/001582
PCT Pub. Date: Jan. 3, 2013

(65) Prior Publication Data
US 2013/0007395 A1    Jan. 3, 2013

(51) Int. Cl.
G06F 12/00 (2006.01)
G06F 13/00 (2006.01)
G06F 3/06 (2006.01)
H04L 29/06 (2006.01)

(52) U.S. Cl.
CPC ............ *G06F 3/0637* (2013.01); *G06F 3/0622* (2013.01); *G06F 3/0635* (2013.01); *G06F 3/067* (2013.01); *H04L 63/083* (2013.01); *H04L 63/10* (2013.01)

(58) Field of Classification Search
None
See application file for complete search history.

(56) References Cited

U.S. PATENT DOCUMENTS

| 8,495,323 | B1* | 7/2013 | Tatavarty | 711/164 |
| 2005/0228946 | A1 | 10/2005 | Gotoh | |
| 2007/0033358 | A1 | 2/2007 | Sekine et al. | |
| 2007/0169186 | A1 | 7/2007 | Ueoka et al. | |
| 2010/0031056 | A1 | 2/2010 | Harada | |
| 2010/0086133 | A1* | 4/2010 | Asano et al. | 380/255 |
| 2012/0047343 | A1* | 2/2012 | Farrell et al. | 711/164 |
| 2013/0086349 | A1* | 4/2013 | Kaiya et al. | 711/164 |
| 2014/0095805 | A1* | 4/2014 | Kapil et al. | 711/145 |

FOREIGN PATENT DOCUMENTS

| EP | 1785833 A2 | 5/2007 |
| JP | 2005-301638 A1 | 10/2005 |
| JP | 2006-011932 A | 1/2006 |
| JP | 2007-041974 A | 2/2007 |

OTHER PUBLICATIONS

Japanese Office Action, Japanese Patent Application No. 2013-548945, Jun. 10, 2014, 8 pp.

* cited by examiner

*Primary Examiner* — Sean D Rossiter
(74) *Attorney, Agent, or Firm* — Volpe and Koenig, P.C.

(57) ABSTRACT

A computer system and an access restriction method may be used to enable security and improve reliability. The computer system includes a first storage apparatus and a second storage apparatus. The first storage apparatus provides a first logical volume from/to which a host apparatus reads and writes data, and the second storage apparatus provides a virtual second logical volume obtained by virtualizing the first logical volume of the first storage apparatus to the host apparatus. The first path information relates to a path from the host apparatus to the second logical volume registered in the first storage apparatus in association with the first logical volume of the first storage apparatus. Reservation of and access to the first logical volume is granted only for a reservation request and access request with matching path information from the host apparatus.

6 Claims, 29 Drawing Sheets

FIG.3

| VOL_ID | VOLUME NUMBER | EXTERNAL VOLUME INFORMATION | | |
|---|---|---|---|---|
| | | VOLUME IDENTIFICATION INFORMATION | CAPACITY | EXTERNAL VOLUME TYPE |
| VOLUME X | 00:12 | — | — | INTERNAL VOLUME |
| VOLUME Y | 44:C0 | 50:34 | 1024.00MB | EXTERNAL VOLUME |
| VOLUME a | 11:56 | 23:F0 | 23.42MB | INTEGRATED MANAGEMENT VOLUME |
| ... | ... | ... | ... | ... |

FIG.4

INITIATOR-TARGET PORT
MAPPING INFORMATION

| | |
|---|---|
| 31A | Host Initiator WWN |
| 31B | Target WWN |
| 31C | Initiator# |
| 31D | Target# |

31

FCP FRAME WHICH IS USED WHEN
TRANSMITTING COMMAND BETWEEN DKC

PARAMETERS OF RESERVATION
COMMAND BETWEEN DKC

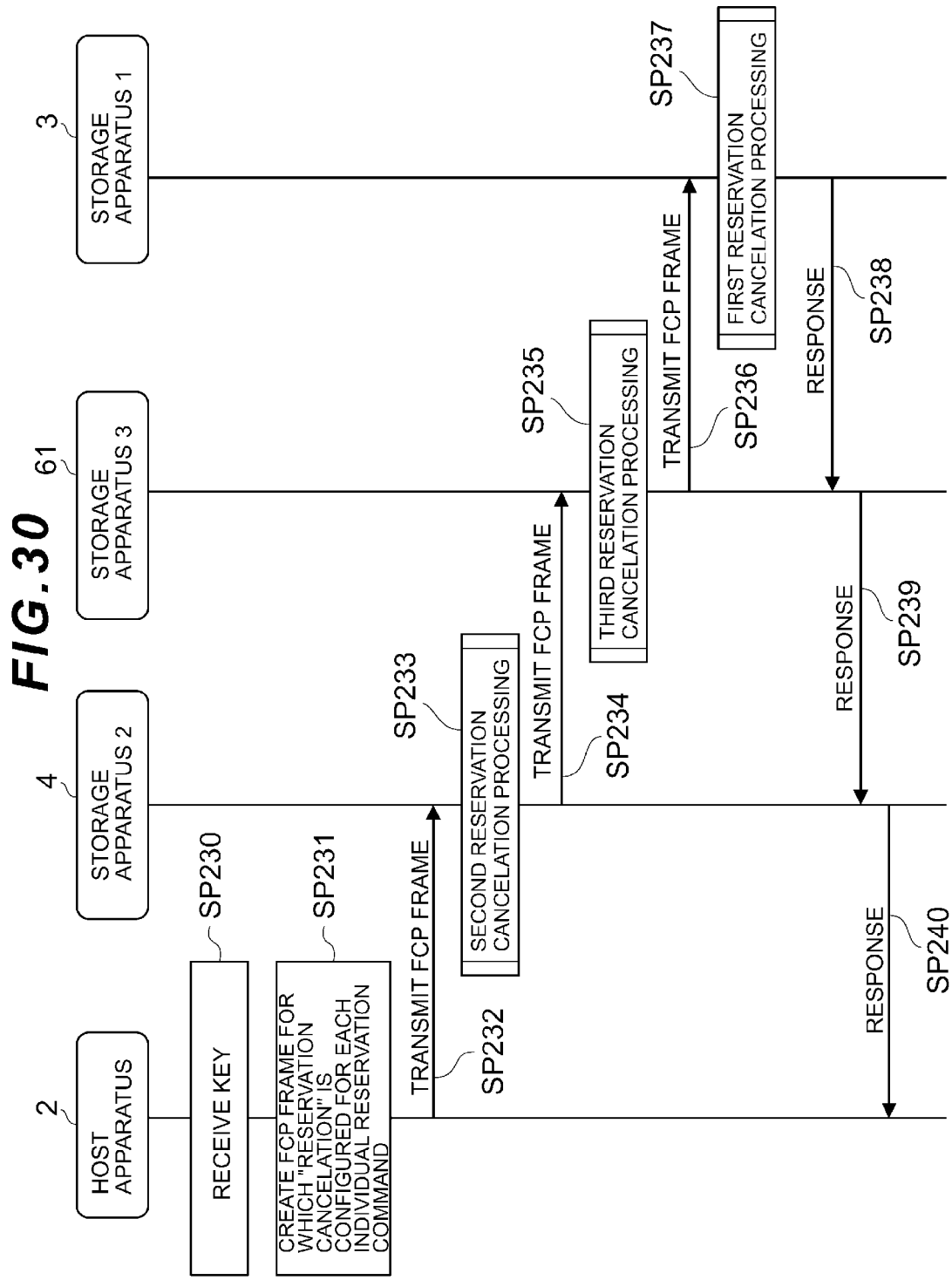

METHOD AND APPARATUS FOR ENHANCED COMPUTER SECURITY

TECHNICAL FIELD

The present invention relates to a computer system and access restriction method and, more particularly, is suitably applied to a computer system to which access restriction technology, with which a host apparatus pre-reserves a logical volume in a storage apparatus when the host apparatus accesses the logical volume, is applied.

BACKGROUND ART

In recent years, virtualization technology, which virtualizes a logical volume which is defined in one storage apparatus (hereinafter this will be called the first storage apparatus) in another storage apparatus (hereinafter this will be called the second storage apparatus) and which provides this virtualized logical volume to a host apparatus, has come into widespread use.

Furthermore, recent years have also witnessed the advent of computer systems which are designed to be able to a use such virtualization technology to virtualize a logical volume in a first storage apparatus by means of a plurality of second storage apparatuses and provide this logical volume to a plurality of host apparatuses. In such computer systems, one logical volume in this first storage apparatus can be shared by the plurality of host apparatuses.

CITATION LIST

Patent Literature

PTL 1: Japanese Patent Laid-Open (Kokai) Application Publication No. 2005-301638
PTL 2: U.S. 2005/0228946 A1

SUMMARY OF INVENTION

Technical Problem

Furthermore, in a computer system for which a configuration is adopted which enables a single logical volume to be shared by a plurality of host apparatuses as described earlier, access restriction technology, with which a host apparatus pre-reserves the logical volume when the host apparatus accesses the logical volume, exists as technology for preventing a plurality of host apparatuses from simultaneously accessing a single logical volume. In this case, the first storage apparatus does not receive an access request for access to a logical volume from another host apparatus if the logical volume has been reserved by any of the host apparatuses.

However, according to this access restriction technology, if the host apparatus reserves the logical volume in the first storage apparatus via a second storage apparatus, the first storage apparatus recognizes that this reservation has been made by the second storage apparatus.

For this reason, although the first storage apparatus subsequently rejects access by the host apparatus via another second storage apparatus, there is a problem in that access is granted if another host apparatus other than the host apparatus which made this reservation performs access via the second storage apparatus which was used for this reservation. Moreover, this problem considerably reduces the security and reliability of the overall system.

The present invention was conceived in view of the foregoing and proposes a computer system and access restriction method with which security and reliability are improved.

Solution to Problem

In order to solve this problem, the present invention provides a computer system, comprising a first storage apparatus which provides a first logical volume from/to which a host apparatus reads and writes data; and a second storage apparatus which provides a virtual second logical volume obtained by virtualizing the first logical volume of the first storage apparatus, to the host apparatus, the first logical volume being pre-reserved when the host apparatus accesses the first logical volume, wherein the second storage apparatus transmits, to the first storage apparatus, a first command containing a first registration-target key, which is supplied by the host apparatus, and first path information, which relates to a path from the host apparatus to the second logical volume, in response to a key registration request from the host apparatus to the effect that a key is to be registered for the second logical volume, transmits, to the first storage apparatus, a second command containing a second key, which is supplied by the host apparatus, and second path information, which relates to a path from the host apparatus to the second logical volume, in response to a reservation request from the host apparatus to the effect that the second logical volume is to be reserved, and transmits, to the first storage apparatus, a third command containing third path information, which relates to a path from the host apparatus to the second logical volume, in response to an access request for access to the second logical volume from the host apparatus, and wherein the first storage apparatus, upon receiving the first command, stores the first key and the first path information contained in the first command as reservation information in association with the first key registration-target logical volume, and, upon receiving the second command, compares the first key and the first path information, which are contained in reservation information stored in association with the first logical volume which is a reservation target, with the second key and the second path information which are contained in the second command and, when there is a match between the first key and the first path information and the second key and the second path information, reserves the first logical volume for use by the host apparatus, and, upon receiving the third command, compares the first path information, which is contained in the reservation information stored in association with the first logical volume which is an access target, with the third path information which is contained in the third command and, when there is a match between the first and third path information, allows access by the host apparatus via the second storage apparatus.

Furthermore, the present invention provides an access restriction method of a computer system which comprises a first storage apparatus which provides a first logical volume from/to which a host apparatus reads and writes data, and a second storage apparatus which provides a virtual second logical volume obtained by virtualizing the first logical volume of the first storage apparatus, to the host apparatus, the first logical volume being pre-reserved when the host apparatus accesses the first logical volume, the access restriction method comprising a first step in which, in response to a key registration request from the host apparatus to the effect that a key is to be registered for the second logical volume, the second storage apparatus transmits, to the first storage apparatus, a first command containing a first registration-target key, which is supplied by the host apparatus, and first path information, which relates to a path from the host apparatus to the second logical volume and, upon receiving the first command, the first storage apparatus stores the first key and the first path information contained in the first command as reservation information in association with the first key registration-target logical volume; a second step in which, in response to a reservation request from the host apparatus to the effect that the second logical volume is to be reserved, the second storage apparatus transmits, to the first storage apparatus, a second command containing a second key, which is supplied by the host apparatus, and second path information, which relates to a path from the host apparatus to the second logical volume and, upon receiving the second command, the first storage apparatus compares the first key and the first path information, which are contained in reservation information stored in association with the first logical volume which is a reservation target, with the second key and the second path information which are contained in the second command and, when there is a match between the first key and the first path information and the second key and the second path information, reserves the first logical volume for use by the host apparatus; and a third step in which, in response to an access request for access to the second logical volume from the host apparatus, the second storage apparatus transmits, to the first storage apparatus, a third command containing third path information which relates to a path from the host apparatus to the second logical volume and, upon receiving the third command, the first storage apparatus compares the first path information, which is contained in the reservation information stored in association with the first logical volume which is an access target, with the third path information which is contained in the third command and, when there is a match between the first and third path information, allows access by the host apparatus via the second storage apparatus.

This computer system and access restriction method allow access to be restricted so that only the host apparatus which made the reservation of the logical volume in the first storage apparatus is able to access the logical volume.

Advantageous Effects of Invention

The present invention is able to realize a computer system and access restriction method which enable security and reliability to be improved.

BRIEF DESCRIPTION OF DRAWINGS

FIG. 3 is a conceptual view provided to illustrate configuration information.

FIG. 4 is a conceptual view provided to illustrate information on mapping between initiator target ports.

FIG. 30 is a sequence diagram serving to illustrate the flow of processes in a reservation cancelation phase of the second embodiment.

DESCRIPTION OF EMBODIMENTS

An embodiment of the present invention will be described in detail hereinbelow with reference to the drawings.

Figure 1:
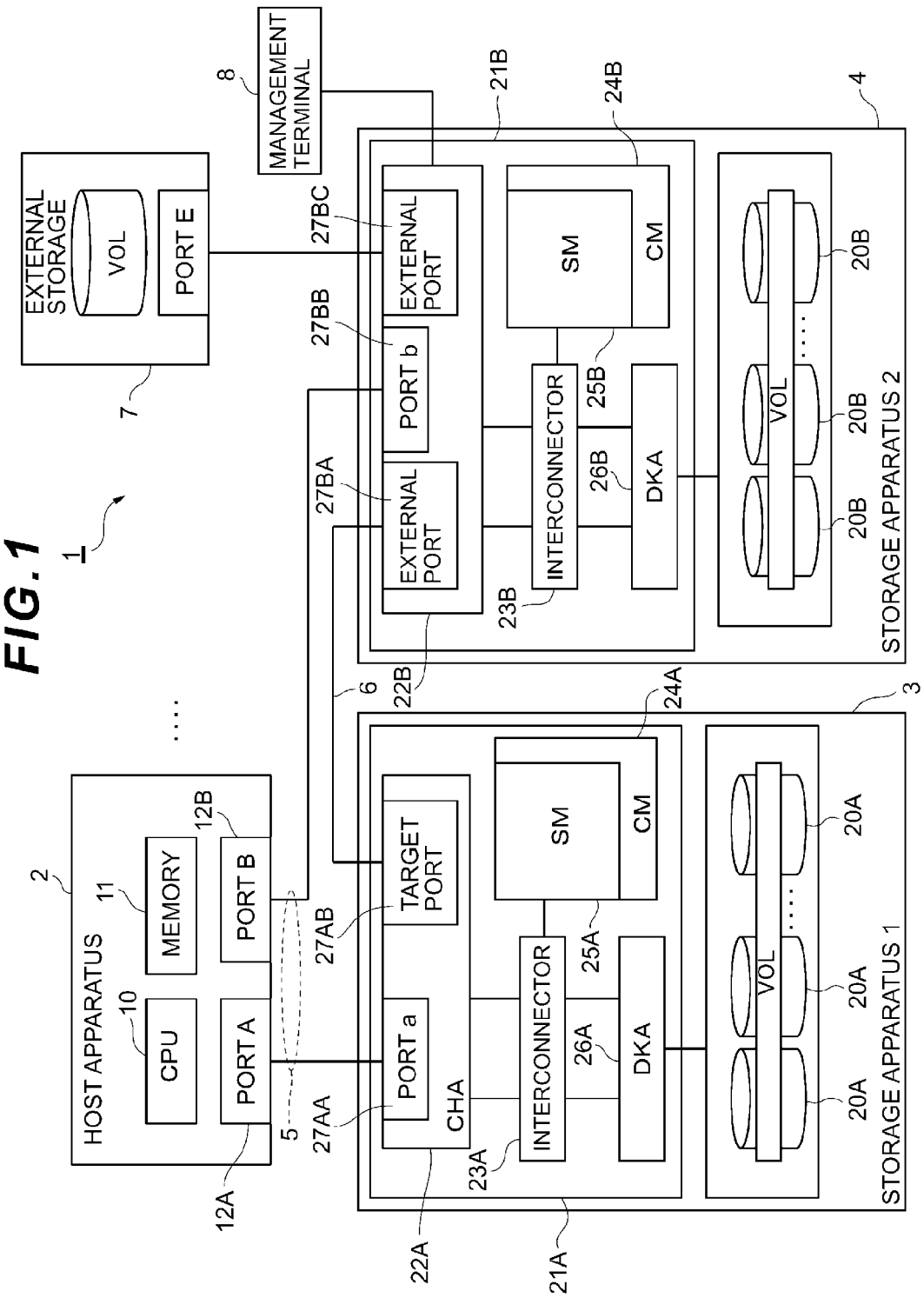
FIG. 1 is a block diagram showing the overall configuration of a computer system according to a first embodiment.

(1) First Embodiment (1-1) Configuration of the Computer System According to this Embodiment In FIG. 1, 1 denotes the computer system according to this embodiment overall. The computer system 1 is configured comprising a plurality of host apparatuses 2 and first and second storage apparatuses 3 and 4. The host apparatuses 2 are each connected to the first and second storage apparatuses 3 and 4 via an FC (Fibre Channel) network 5, for example, and the first and second storage apparatuses 3 and 4 are interconnected via an FC cable 6, for example. An external storage apparatus (hereinafter called the external storage apparatus) 7 is connected to the second storage apparatus 4.

The host apparatus 2 is a computer device comprising a CPU (Central Processing Unit) 10, a memory 11, and a plurality of ports 12A, 12B and the like, and is configured from a personal computer device and a workstation or mainframe, for example. The host apparatus 2 comprises, for example, information input devices (not shown) such as a keyboard, a switch, a pointing device, and a microphone, and information output devices (not shown) such as a monitor display and speaker, and the like, for example.

The first and second storage apparatuses 3 and 4 are configured from a plurality of storage devices 20A, 20B, and controllers 21A, 21B for controlling data I/Os to/from these storage devices 20A, 20B.

The storage devices 20A, 20B are configured from high-cost disks such as FC disks or low-cost disks such as SATA (Serial AT Attachment) disks, for example. A RAID group is configured from one or more storage devices 20A, 20B and one or more logical volumes (hereinafter called logical volumes) VOL are created in storage areas provided by a single RAID group. Furthermore, data is stored in block units of a predetermined size in the logical volume VOL (hereinafter called logical volumes).

The logical volumes VOL are each assigned a unique identifier (hereinafter these are called volume numbers). In the case of this embodiment, the data I/Os are made by designating these volume numbers and addresses which are obtained by combining a unique number (LBA: Logical Block Address) with a logical block which is assigned to each of the logical blocks).

The controllers 21A, 21B are configured comprising one or more channel adapters 22A, 22B, interconnectors 23A, 23B, cache memories 24A, 24B and shared memories 25A, 25B, and one or more disk adapters 26A, 26B.

The channel adapters 22A, 22B are configured as microcomputer systems which comprise a CPU and memory or the like, and comprise one or more ports 27AA, 27AB, 27BA, 27BB, and 27BC for connecting to an FC network 5. The channel adapters 22A, 22B execute various processing which will be described subsequently in addition to parsing and executing commands which are transmitted from the host apparatus 2 or another storage apparatus (the second storage apparatus 4 or first storage apparatus 3) on the basis of a control program which is stored in a memory provided inside the channel adapters 22A, 22B. The ports 27AA, 27AB, and 27BA to 27BC of the respective channel adapters 22A and 22B are each assigned a network address (an IP address or WWN (World Wide Name, for example), referred to hereinbelow as WWN) for identifying each of the ports and, accordingly, the individual channel adapters 22A, 22B can be individually treated as NAS (Network Attached Storage).

The interconnectors 23A, 23B are connected to the channel adapters 22A, 22B, the cache memories 24A, 24B, the shared memories 25A, 25B, and the disk adapters 26A, 26B. The sending and receiving of data and commands between the channel adapters 22A, 22B, the cache memories 24A, 24B, the shared memories 25A, 25B and the disk adapters 26A, 26B is performed via the interconnectors 23A, 23B. The interconnectors 23A, 23B are configured from switches or buses or the like such as an ultra-high-speed crossbar switch which performs data transfers by means of high-speed switching, for example.

The cache memories 24A, 24B are storage memories which are shared by the channel adapters 22A, 22B and disk adapters 26A, 26B. These cache memories 24A, 24B are mainly used to uniquely store data which is input/output to/from the logical volumes VOL.

The shared memories 25A, 25B are also storage memories which are shared by channel adapters 22A, 22B and disk adapters 26A, 26B. The shared memories 25A, 25B are configured by logically delimiting part of the cache memories 24A, 24B, and store information such as configuration information for the first storage apparatus 3 or second storage apparatus 4. The configuration information and reservation information, as well as initiator target port-mapping information, which are described subsequently, are also stored in the shared memories 25A, 25B.

The disk adapters 26A, 26B are configured as microcomputer systems comprising microprocessors and memories and the like and function as interfaces for performing protocol control during communications with each of the storage devices 20A, 20B. The disk adapters 26A, 26B are connected to the corresponding storage devices 20A, 20B via an FC cable, for example, and exchange data between the storage devices 20A, 20B according to the FC protocol.

In the case of this embodiment, a management terminal 8 is connected to the channel adapter 22B of the second storage apparatus 4. The management terminal 8 is a computer device which the system administrator uses to perform maintenance management on the second storage apparatus 4, and is configured from a notebook-type personal computer or the like, for example. The management terminal 8 collects and displays the required information relating to the second storage apparatus 4 from this channel adapter 22B, and performs configuration and the like of the second storage apparatus 4 by transmitting the required commands to the channel adapter 22B according to the operation of the system administrator.

The external storage apparatus 7 is a storage apparatus which is provided separately from the first and second storage apparatuses. The configuration of this external storage apparatus is the same as that of the first and second storage apparatuses and hence the details will not be described here.

(1-2) Various Functions of the Computer System

Figure 2:
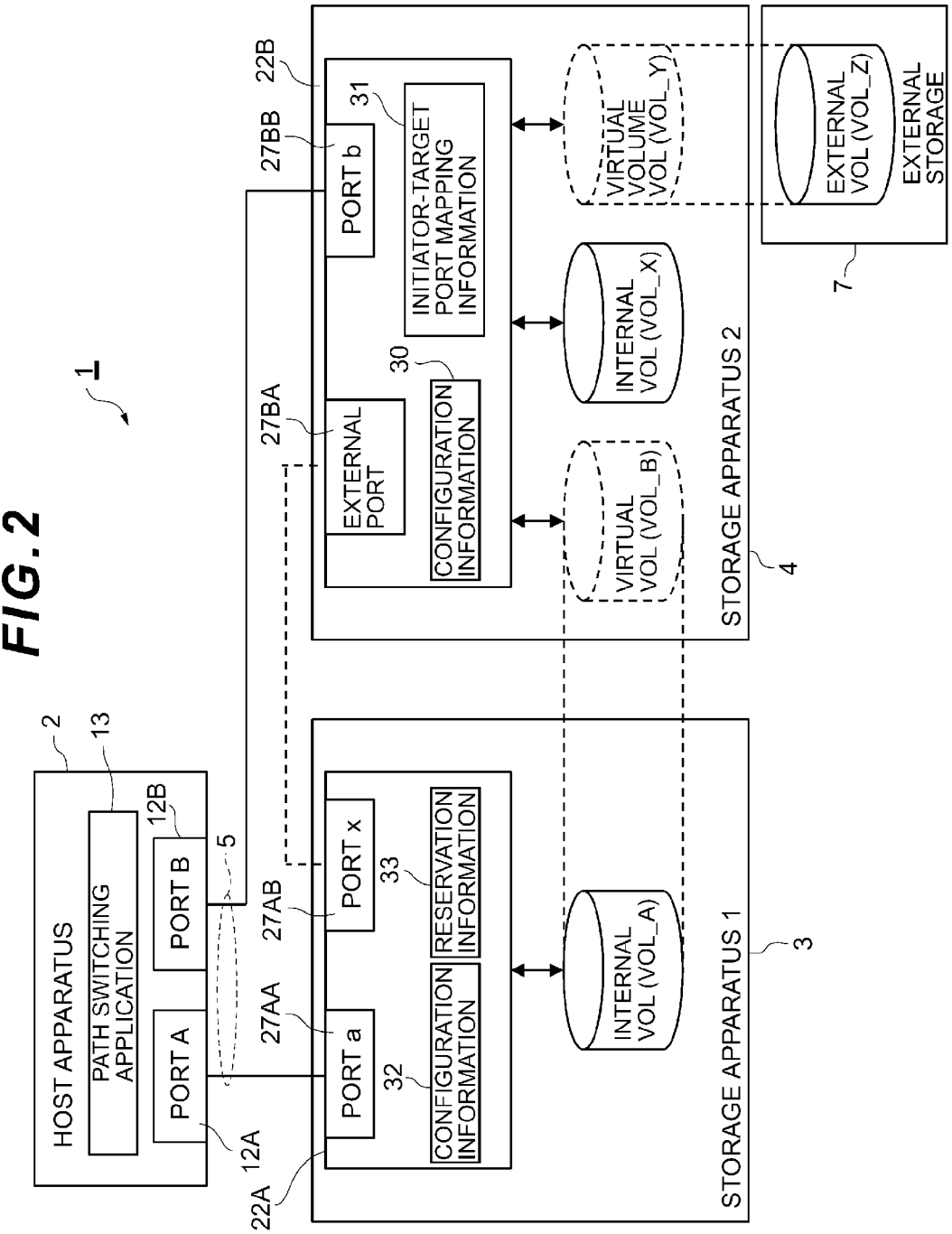
FIG. 2 is a block diagram showing the logical configuration of the computer system in FIG. 1.

FIG. 2 shows the logical configuration of the computer system 1. In the case of this embodiment, the second storage apparatus 4 has an external connection function installed which provides a logical volume VOL_X to the host apparatus 2 as a logical volume in its own storage apparatus by mapping a logical volume VOL_Z defined in the external storage apparatus 7 to a virtual volume VOL_Y which is created in its own storage apparatus.

Furthermore, if a read command which targets this virtual volume VOL_Y is supplied by the host apparatus 2, by transmitting a command corresponding to this read command to the external storage apparatus 7, the second storage apparatus 4 reads the required data from the corresponding address position in the logical volume VOL_Z and transfers the read data to the host apparatus 2. Furthermore, if a write command which targets this virtual volume VOL_Y is supplied together with write target data by the host apparatus 2, by transmitting a command which corresponds to the write command and write-target data to the external storage apparatus 7, the second storage apparatus 4 writes this data to the corresponding address position in the logical volume VOL_Z.

In addition, the second storage apparatus 4 also has a built-in integrated management function which makes it possible to virtualize all the other storage apparatuses and provide them to the host apparatus 2. Furthermore, in the computer system 1 according to this embodiment, the integrated management function which is installed in the second storage apparatus 4 is used in order to enable the host apparatus 2 to be able to directly access a logical volume VOL_A in the first storage apparatus 3 and to be able to access this logical volume VOL_A in the first storage apparatus 3 via the second storage apparatus 4.

In this case, since the host apparatus 2 is allowed to access the logical volume VOL_A in the first storage apparatus 3 via the second storage apparatus 4, the user creates a virtual volume VOL-B in the second storage apparatus 4 in correspondence with the logical volume VOL_A in the first storage apparatus 3 and maps the virtual volume VOL_B thus created to the logical volume VOL_A in the first storage apparatus 3, as shown in FIG. 2.

Subsequently, the user switches the access destination of the host apparatus 2 from the logical volume VOL_A in the first storage apparatus 3 to the virtual volume VOL_B in the second storage apparatus 4 by means of a path switching application mounted in the host apparatus 2. As a result, a read command or write command from the host apparatus 2 which is for the logical volume VOL_A in the first storage apparatus 3 subsequently is subsequently issued by the host apparatus 2 as a read command or write command which targets the virtual volume VOL_B of the second storage apparatus 4.

Further, if a read command targeting this virtual volume VOL_B is issued by the host apparatus 2, by transmitting a command which corresponds to the read command to the first storage apparatus 3, the second storage apparatus 4 then reads the required data from the corresponding address position in the logical volume VOL_A and transfers the read data to the host apparatus 2. Furthermore, if a write command which targets this virtual volume VOL_B and write-target data are supplied by the host apparatus 2, by transmitting a command which corresponds to the write command and the write-target data to the first storage apparatus 3, the second storage apparatus 4 writes this data to the corresponding address position in the logical volume VOL_A.

Furthermore, in a computer system 1 according to this embodiment, a technology is adopted whereby the host apparatus 2 pre-reserves the logical volume when the host apparatus 2 accesses the logical volume in the storage apparatus. Hence, if the host apparatus 2 accesses the logical volume VOL_A of the first storage apparatus 3 via the second storage apparatus 4, the host apparatus 2 must pre-reserve the logical volume VOL_A by transmitting a reservation command to the first storage apparatus 3 via the second storage apparatus 4.

In this case, the reservation of the logical volume VOL_A in the first storage apparatus 3 via the second storage apparatus 4 by the host apparatus 2 is recognized by the first storage apparatus 3 as a reservation that is performed by the second storage apparatus 4.

Hence, another host apparatus 2 other than the host apparatus 2 which reserved the logical volume VOL_A is subsequently able to access the logical volume VOL_A in the first storage apparatus 3 via the virtual volume VOL_B, which is an inadequate problem from a security standpoint.

Therefore, the computer system 1 according to this embodiment has a built-in access restriction function which performs access restrictions so that only the host apparatus 2 which reserved the logical volume VOL_A in the first storage apparatus 3 is able to access the logical volume VOL_A.

More specifically, according to this embodiment, when the host apparatus 2 reserves the logical volume VOL_A in the first storage apparatus 3 via the second storage apparatus 4, the second storage apparatus 4 reports information which is unique to the path relating to the path from the host apparatus 2 to the virtual volume VOL_B in the second storage apparatus 4 (hereinafter this will be called path information), to the first storage apparatus 13. In the case of this embodiment, information which is adopted as this path information is information relating to the WWN of the port 12B which is used when communicating with the second storage apparatus 4 of the host apparatus 2 and information relating to port 27BB which is used when communicating with the host apparatus 2 of the second storage apparatus 4. Further, the first storage apparatus 3 stores this path information as reservation information when reserving this logical volume VOL_A.

In addition, if a read command or write command which targets the virtual volume VOL_B is supplied by the host apparatus 2, the second storage apparatus 4 then includes path information relating to a path, which connects the host apparatus 2 and second storage apparatus 4, in a command which is created in response to the read command or write command and transmits the command to the first storage apparatus 3.

Furthermore, upon receiving this command, the first storage apparatus 4 compares the aforementioned path information contained in the command with path information which is pre-stored for the logical volume VOL_A which is the access target and allows access to the logical volume VOL_A only if there is a match between this path information.

With this access restriction function, restrictions can be enforced so that only the host apparatus 2 which reserved the logical volume VOL_A in the first storage apparatus 3 is able to access the logical volume VOL_A via the second storage apparatus 4.

As means for implementing an access restriction function according to the embodiment above, a path switching application 13 is stored as shown in FIG. 2 in the memory 11 (FIG. 1) of the host apparatus 2, and the shared memory 25B (FIG. 1) of the second storage apparatus 4 stores configuration information 30, an initiator target port-mapping information table 31 and a mapping table 34, and the shared memory 25A (FIG. 1) of the first storage apparatus 3 stores configuration information 32, reservation information 33, and a mapping table.

Among these, the path switching application 13 is application software which has a function for switching the path used to another path when the host apparatus 2 communicates with an external device. In the case of this embodiment, the path switching application 13 switches the path enabling the host apparatus 2 to access the logical volume VOL_A in the first storage apparatus 3 to either the path via the port 12A (FIG. 1) which is connected to the first storage apparatus 3 or the path via the port 12B (FIG. 1) which is connected to the second storage apparatus 4.

Meanwhile, the configuration information 30, 32 is information whereby the first storage apparatus 3 and second storage apparatus 4 manage the logical volumes (real volumes and virtual volumes) which are defined within these apparatuses. As shown in FIG. 3, the configuration information comprises volume name fields 30A, 32A, volume number fields 30B, 32B, and external volume information fields 30C, 32C, and the external volume information fields 30C, 32C have a table structure which is configured form volume identification information fields 30D, 32D, capacity fields 30E, 32E, and external volume type fields 30F, 32F.

Further, the volume name fields 30A, 32A stores volume names of the logical volumes defined in the second storage apparatus 4 and first storage apparatus 3, and the volume number fields 30B, 32B store volume numbers which are assigned to the corresponding logical volumes. In addition, the volume identification information fields 30D, 32D store the volume numbers of the logical volumes in the other storage apparatuses which are associated with the corresponding logical volumes, and the capacity fields 30E, 32E store the capacity of the logical volumes.

Furthermore, the external volume type fields 30F, 32F store volume types for the corresponding logical volumes. In this case, volume types include "internal volume," which indicates that the logical volume is a logical volume which is defined in the second storage apparatus 4 or first storage apparatus 3, "external volume," which indicates that the logical volume is a virtual volume which is obtained by virtualizing a logical volume in the external storage apparatus 7 by means of an external connection function, and "integrated management volume," which indicates that the logical volume is a virtual volume which is obtained by virtualizing a logical volume in another storage apparatus by means of the foregoing integrated management function.

Therefore, FIG. 3 shows that a logical volume known as "volume X" which is defined in the second storage apparatus 4 or first storage apparatus 3 which hold the configuration information is an "internal volume" to which a volume number "00:12" is assigned, that a logical volume called "volume Y" is an "external volume" which is assigned a volume number "44:00" obtained by using the external connection function to virtualize a logical volume with a capacity "1024.00 MB" with a volume identification number "50:34" in the external storage apparatus 7, and a logical volume known as "volume B" is an "integrated management volume" which is assigned a volume number "11:56" obtained by using the integrated management function to virtualize a logical volume with a capacity "23.42 MB" of the volume identification number "23:F0" in another storage apparatus.

The initiator target port-mapping information table 31 is a table which is used to manage path information on paths which are used during communications between the host apparatus 2 and the second storage apparatus 4 and, as shown in FIG. 4, is configured from a host initiator WWN field 31A, a target WWN field 31B, an initiator number field 31C and a target number field 31D.

Furthermore, the host initiator WWN field 31A stores the WWN of ports (hereinafter these will be called host initiator WWN) of the host apparatus 2 which are used during communication between the host apparatus 2 and the second storage apparatus 4, and the target WWN field 31B stores WWN (hereinbelow these will be called target WWN) of ports of the second storage apparatus 4 which are used in this communication.

In addition, the initiator number field 31C stores identification information (hereinafter these will be called initiator numbers) which is calculated by substituting these host initiator WWN in a predetermined arithmetic expression and the target number field 31D stores identification information (hereinafter these will be called target numbers) which is calculated by substituting these target WWN into a predetermined arithmetic expression.

Figure 5:
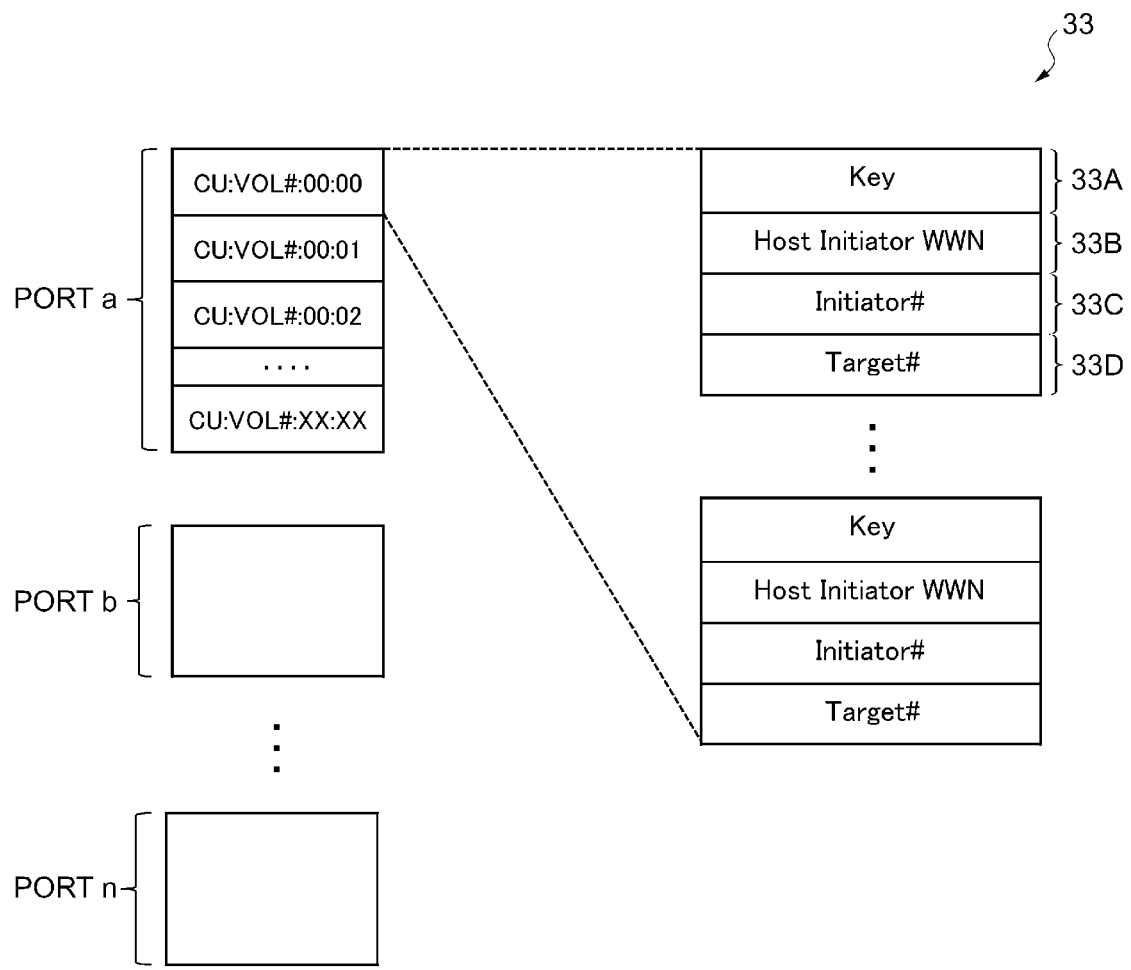
FIG. 5 is a conceptual view provided to illustrate reservation information.

Meanwhile, as shown in FIG. 5, the reservation information 33 is information which is used to manage the correspondence relationships between each of the ports 27AA, 27AB and each of the logical volumes VOL_A in the first storage apparatus 3, and keys which are configured for each of the logical volumes VOL_A, and the information part which is used to manage the keys configured for each of the logical volumes VOL_A has a table structure which comprises a key field 33A, a host initiator WWN field 33B, an initiator number field 33C, and a target number field 33D.

Further, the key field 33A stores a key which is configured by the host apparatus 2 for the corresponding logical volume VOL_A and the host initiator WWN field 33B stores the WWN (host initiator WWN) of the port 12B (FIG. 1) of the host apparatus 2 which is used when the host apparatus 2 accesses the logical volume VOL_A. In addition, the initiator number field 33C stores an initiator number which is calculated on the basis of the host initiator WWN, and the target number field 33D stores a target number which is calculated on the basis of the WWN (target WWN) of the port 27BB (FIG. 1) of the second storage apparatus 4 which is connected to the host apparatus 2.

(1-3) Various Processing Relating to Access Restriction Function

Various processing which is executed in the computer system in association with the aforementioned access restriction function will be described next.

(1-3-1) Flow of Series of Processes Relating to Access Restriction Function

Figure 6:
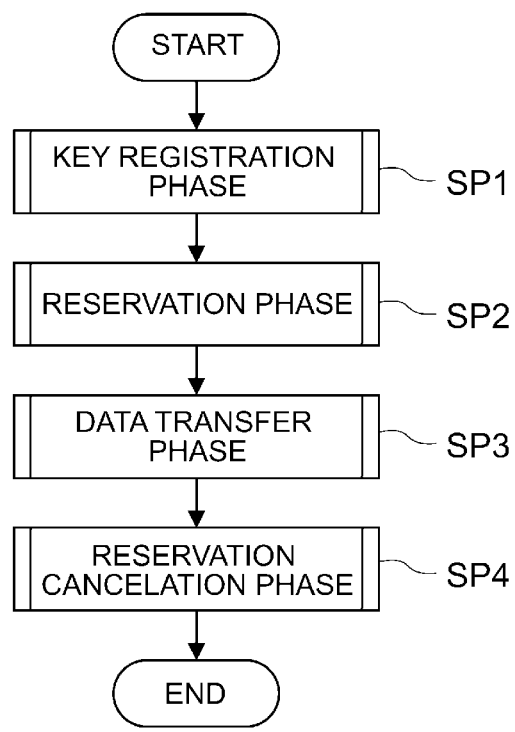
FIG. 6 is a flowchart showing the flow of a series of processes relating to an access restriction function.

FIG. 6 shows the flow of access restriction processing which is executed in the computer system relating to the aforementioned access restriction function. As is also clear from FIG. 6, the access restriction processing comprises four phases, namely, a key registration phase (SP1), a reservation phase (SP2), a data transfer phase (SP3), and a reservation cancelation phase (SP4).

Among these, the key registration phase is a phase in which the host apparatus 2 registers a key in a logical volume VOL_A in the first storage apparatus 3 via the second storage apparatus 4, and the reservation phase is a phase in which the host apparatus 2 subsequently reserves a logical volume in the first storage apparatus 3 via the second storage apparatus 4.

Furthermore, the data transfer phase is a phase in which, following the reservation phase, the host apparatus 2 accesses the logical volume VOL_A in the reserved first storage apparatus 3 via the second storage apparatus 4, and the reservation cancelation phase is a phase in which the reservation of the logical volume VOL_A is canceled by the host apparatus 2.

The specific content of the key registration phase, the reservation phase, the data transfer phase and the reservation cancelation phase will be described hereinbelow.

Figure 7:
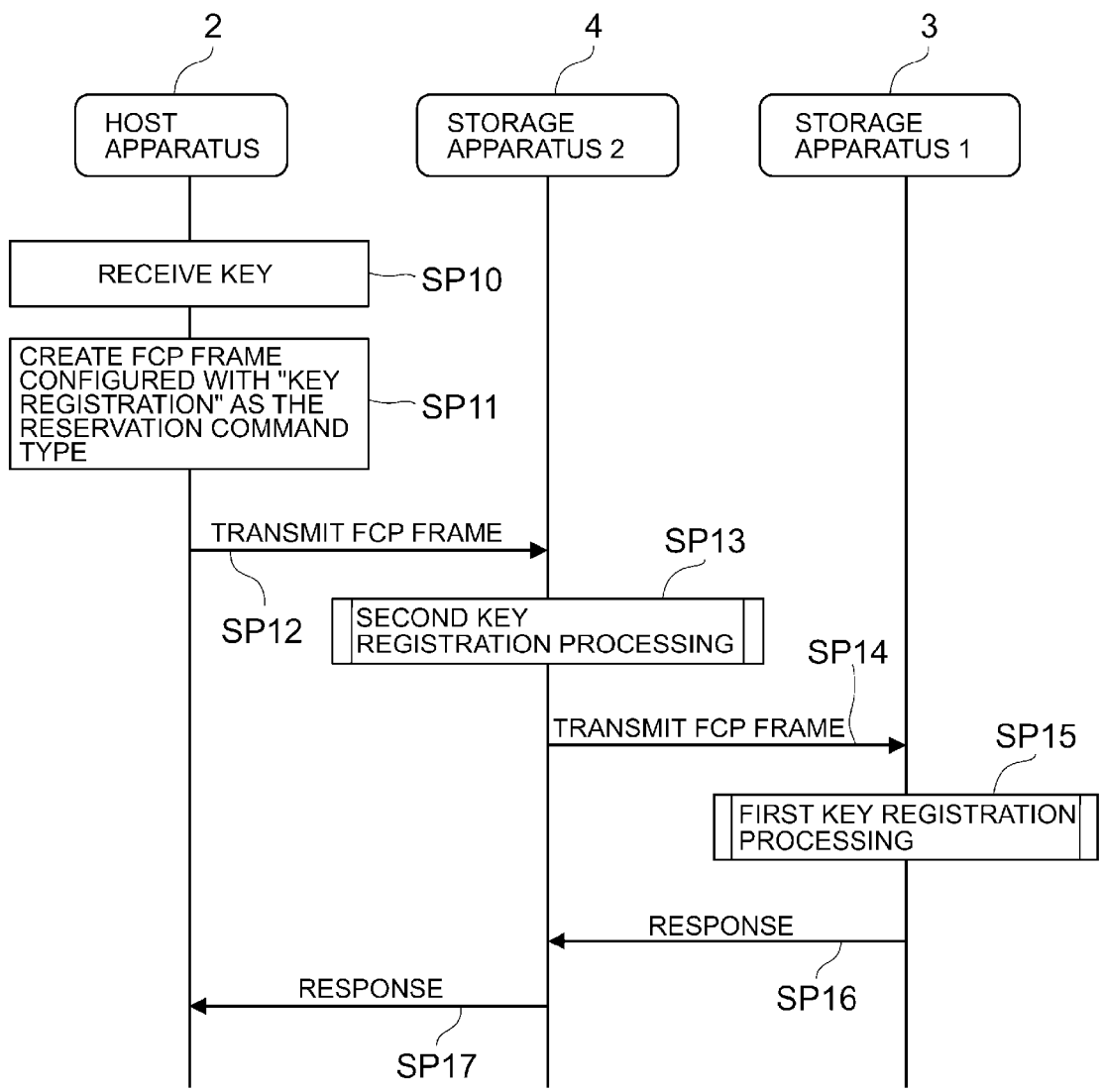
FIG. 7 is a sequence diagram serving to illustrate the flow of processes in a key registration phase.

(1-3-2) Various Processing in Key Registration Phase (1-3-2-1) Flow of Processing in Key Registration Phase FIG. 7 shows the flow of processing in the aforementioned key registration phase. The key registration phase is started as a result of the user using the host apparatus 2 to designate the volume number of the logical volume (hereinafter this will be called the key registration target volume) VOL_A for key registration in the first storage apparatus 3, and a key that is configured at this time.

Upon receiving this volume number and key (SP10), the host apparatus 2 creates a command to the effect that a key designated at this time should be configured in a key registration target volume VOL_A (SP11).

Figure 8:
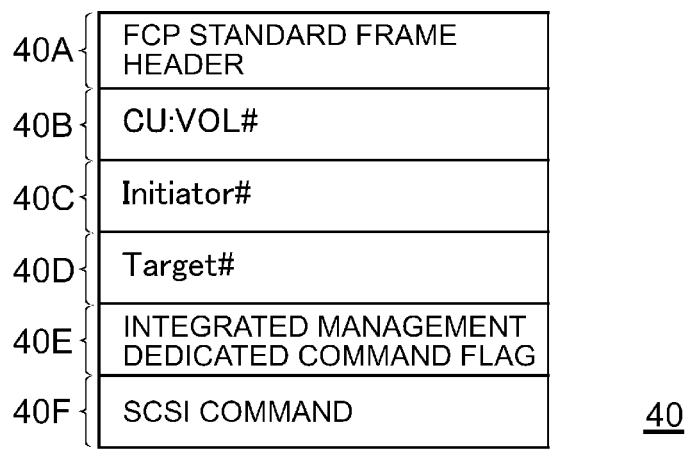
FIG. 8 is a conceptual view serving to illustrate an FCP frame.

Here, FIG. 8 shows the format of a command which is transmitted by the host apparatus 2 to the second storage apparatus. Since, as mentioned earlier, the host apparatus 2 is connected to the first storage apparatus 3 and second storage apparatus 4 via an FC network, this command is created as an FCP (Fibre Channel Protocol) frame 40 as shown in FIG. 8 according to the FC protocol. More specifically, this FCP frame 40 is configured comprising an FCP standard frame header field 40A, a volume number field 40B, an initiator number field 40C, a target number field 40D, an integrated management dedicated command flag field 40E, and an SCSI (Small Computer System Interface) command field 40F.

Among these, the FCP standard frame header field 40A stores standard header information which is designated by the FC protocol and the volume number field 40B stores a volume number of the logical volume which is targeted by the FCP frame 40. Furthermore, the initiator number field 40C stores an initiator number of the source port of the FCP frame 40 and the target number field 40D stores the target number of the destination port of the FCP frame 40.

In addition, the integrated management dedicated command flag field 40E stores a flag (hereinafter called an integrated management dedicated command flag) which indicates whether or not the FCP frame 40 is a dedicated command (hereinafter called an integrated management dedicated command) which is issued if the logical volume targeted by the FCP frame 40 is an integrated management volume. More specifically, if the FCP frame 40 is an integrated management dedicated command, the integrated management dedicated command flag field 40E stores "1," and if the FCP frame 40 is not an integrated management dedicated command, the integrated management dedicated command flag field 40E stores "0."

Figure 9:
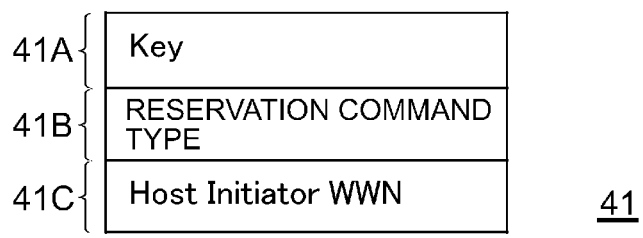
FIG. 9 is a conceptual view serving to illustrate a reservation command

Furthermore, the SCSI command field 40F stores an SCSI command type (read command or write command or the like) of the FCP frame 40 and the specific content of this command (the read or write start address or the like). However, if the FCP frame 40 is an integrated management dedicated command, the SCSI command field 40F stores, as shown in FIG. 9, a reservation command 41 which comprises key information 41A which indicates the key which is to be configured in a key registration target volume VOL_A, reservation command type information 41B which indicates the command type (hereinafter this will be called the reservation command type) if the FCP frame 40 is an integrated management dedicated command, and host initiator WWN information 41C which indicates the WWN of the port of the host apparatus to which the FCP frame is transmitted.

Note that there are three reservation command types, namely, "key registration," which requests key registration for the targeted logical volume, "reservation," which requests reservation of the targeted logical volume, and "reservation cancelation" which requests cancelation of the reserved state of the logical volume. Accordingly, if the FCP frame is an integrated management dedicated command, a code which indicates any of these three types of reservation command types is stored in this SCSI command field.

Therefore, in step SP11, the host apparatus 2 stores the volume number of the virtual volume VOL_B in the second storage apparatus 4, which is associated with the key registration target volume VOL_A designated by the user, in the volume number field 40B, stores an initiator number which is calculated on the basis of the WWN (host initiator WWN) of the port 12B (FIG. 1) in the host apparatus 2 used when the host apparatus 2 accesses the virtual volume VOL_B in the initiator number field 40C, stores a target number, which is calculated on the basis of the WWN of the port 27BB (FIG. 1) of the second storage apparatus 4 used when the host apparatus 2 accesses the virtual volume VOL_B, in the target number field 40D, configures the integrated management dedicated command flag as "0", and creates an FCP frame 40 in which a reservation command 41 is stored in the SCSI command field 40F, the reservation command comprising a key which is to be configured at the time, a code which corresponds to the reservation command type known as "key registration," and the host initiator WWN of the host apparatus 2.

Further, the host apparatus 2 subsequently transmits the FCP frame 40 which was created as mentioned earlier to the second storage apparatus 4 (SP12).

Upon receiving this FCP frame 40, the second storage apparatus 4 registers the host initiator WWN, initiator number and target number which are contained in the FCP frame, and the WWN (target WWN) of the port 27BB of the second storage apparatus 4 which received the FCP frame 40 in the initiator target port-mapping information table 31 (FIG. 4) (SP13).

Furthermore, the second storage apparatus 4 stores the volume number of the key registration target volume VOL_A in the first storage apparatus 3 in the volume number field 40B, stores the initiator number and target number which are registered in the initiator target port-mapping information table 31 in the initiator number field 40C and target number field 40D, and creates an FCP frame 40 which is obtained by storing as is the reservation command 41 contained in the FCP frame 40 from the host apparatus 2 in the SCSI command field 40F (SP13).

The second storage apparatus 4 transmits the FCP frame 40 thus created to the first storage apparatus 3 (SP14).

Upon receiving this FCP frame 40, the first storage apparatus 3 captures the required information such as the key and host initiator WWN and so on from the FCP frame 40 and executes first key registration processing in which the captured information is registered as reservation information 33 (FIG. 5) of the key registration target volume VOL_A (SP15).

When the first key registration processing is complete, the first storage apparatus 3 transmits a response to that effect to the second storage apparatus 4 (SP16). Furthermore, upon receiving this response, the second storage apparatus 4 transfers the response to the host apparatus 2 (SP17).

(1-3-2-2) Second Key Registration Processing

Figure 10:
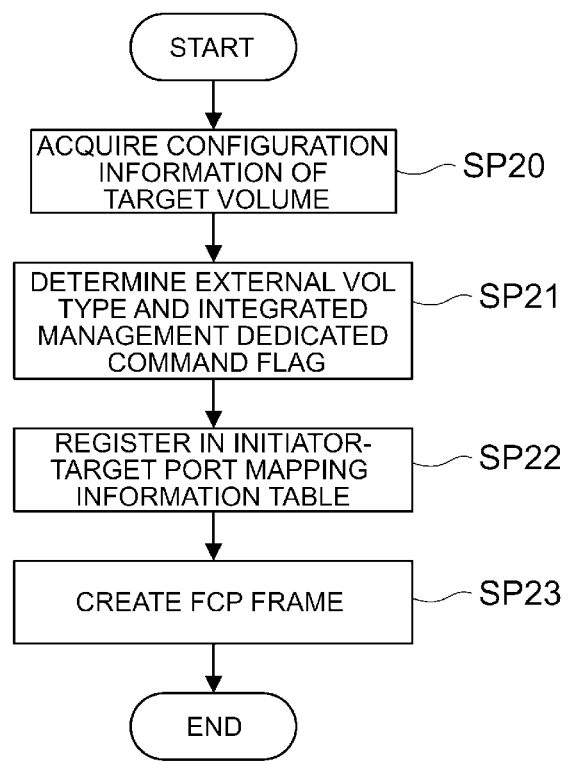
FIG. 10 is a flowchart showing a processing routine for second key registration processing.

Here, FIG. 10 shows the specific processing content of second key registration processing which is executed by the channel adapter 22B (FIG. 1) in the second storage apparatus 4 which receives the FCP frame 40 from the host apparatus 2 in step SP13 of the key registration phase.

Upon receiving the FCP frame 40 from the host apparatus 2, this channel adapter 22B starts the second key registration processing shown in FIG. 10, and first refers to the configuration information 30 (FIG. 3) stored in the shared memory 25B (FIG. 1) to acquire the external volume type of the logical volume which is targeted by the FCP frame 40 then received (here, the virtual volume VOL_B in the second storage apparatus 4 which is mapped to the key registration target volume VOL_A) (SP20).

Thereafter, the channel adapter 22B makes a determination of whether or not the external volume type acquired in step SP20 is "integrated management volume" and determines whether or not the value of the integrated management dedicated command flag stored in the FCP frame 40 is "0" (SP21).

Note that if a determination is obtained in step SP21 that the external volume type of the logical volume targeted by the FCP frame 40 is not "integrated management volume" (rather, is "internal volume" or "external volume"), the FCP frame 40 is a command targeting the internal volume in the second storage apparatus 4 or the virtual volume that was created by the external connection function, and hence the channel adapter 22B executes the processing designated in the FCP frame 40 which targets the internal volume or virtual volume.

If, on the other hand, the channel adapter 22B obtains a determination in step SP21 that the external volume type of the logical volume targeted by the FCP frame 40 is "integrated management volume" and the value of the integrated management dedicated command flag in the FCP frame 40 is "0", the channel adapter 22B captures the host initiator WWN, initiator number and target number from the FCP frame 40 and registers this information in the initiator target port-mapping information table 31 in association with the WWN (target WWN) of the port 27BB (FIG. 1) of the second storage apparatus 4 which received the FCP frame 40 (SP22).

The channel adapter 22B subsequently creates an FCP frame 40 for transferring the reservation command 41 (FIG. 9) contained in the FCP frame 40 to the first storage apparatus 3 (SP23).

More specifically, the channel adapter 22B acquires the volume number of the logical volume (key registration target volume VOL_A) in the first storage apparatus 3, which is mapped to the logical volume (virtual volume VOL_B) targeted by the FCP frame 40 from the host apparatus 2, from the configuration information 30 (FIG. 2). Furthermore, the channel adapter 22B reads the initiator number and target number from the initiator target port-mapping information table 31. The channel adapter 22B then creates an FCP frame 40 which is obtained by storing the volume number of the thus acquired key registration target volume VOL_A, the initiator number and the target number in the volume number field 40B, the initiator number field 40C, and the target number field 40D respectively. Here, the channel adapter 22B configures "1" for the integrated management dedicated command flag field 40E of the FCP frame 40.

The channel adapter 22B subsequently terminates the second key registration processing. The FCP frame 40 thus created is subsequently transmitted to the first storage apparatus 3 in step SP14 of FIG. 7.

(1-3-2-3) First Key Registration Processing

Figure 11:
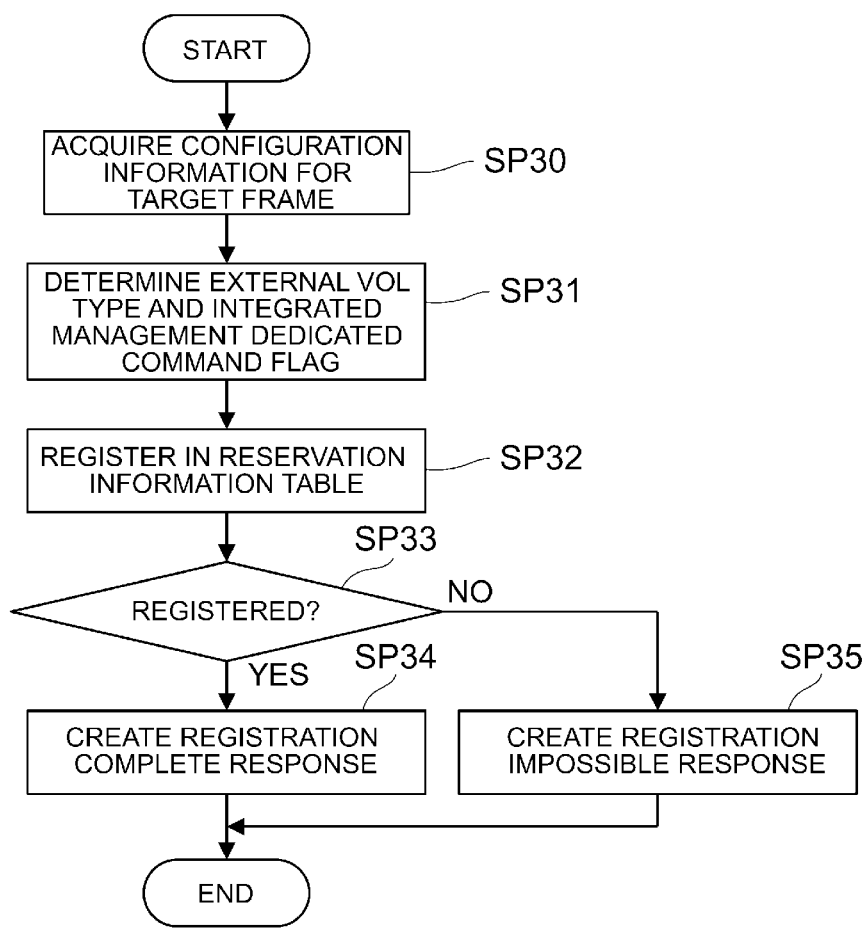
FIG. 11 is a flowchart showing a processing routine for first key registration processing.

FIG. 11 shows specific processing content of the first key registration processing which is executed by the channel adapter 22A (FIG. 1) in the first storage apparatus 3 which receives the aforementioned FCP frame 40 which is transmitted by the second storage apparatus 4 in step SP15 of the key registration phase (FIG. 7).

Upon receipt of this FCP frame 40, the channel adapter 22A starts the first key registration processing shown in FIG. 11 and first refers to the configuration information 32 (FIG. 3) stored in the shared memory 25A (FIG. 1) to acquire the external volume type of the logical volume (here this is the key registration target volume VOL_A) targeted by the FCP frame 40 (SP30).

The channel adapter 22A subsequently makes a determination of whether or not the external volume type acquired in step SP30 is "internal volume" and determines whether or not the value of the integrated management dedicated command flag contained in the FCP frame 40 is "1" (SP31).

Further, if the channel adapter 22A obtains a determination in step SP31 that the external volume type of the logical volume targeted by the FCP frame 40 is "internal volume" and the value of the integrated management dedicated command flag contained in the FCP frame 40 is "1," the channel adapter 22A captures the initiator number, target number, key and host initiator WWN from the FCP frame 40 and registers the captured information as reservation information 33 (FIG. 5) which corresponds to the key registration target volume VOL_A (SP32).

Furthermore, the channel adapter 22A determines whether or not this registration has been performed (SP33) and, if an affirmative result is obtained, creates a response to that effect (SP34) and subsequently terminates the first key registration processing. However, if a negative result is obtained in step SP33 due, for example, to a lack of storage capacity of the storage area where the reservation information is stored, the channel adapter 22A creates a response to that effect (SP35) and subsequently terminates the first key registration processing. Accordingly, the response which is then created in step SP34 or SP35 is transmitted to the second storage apparatus 4 in step SP16 in FIG. 7.

Figure 12:
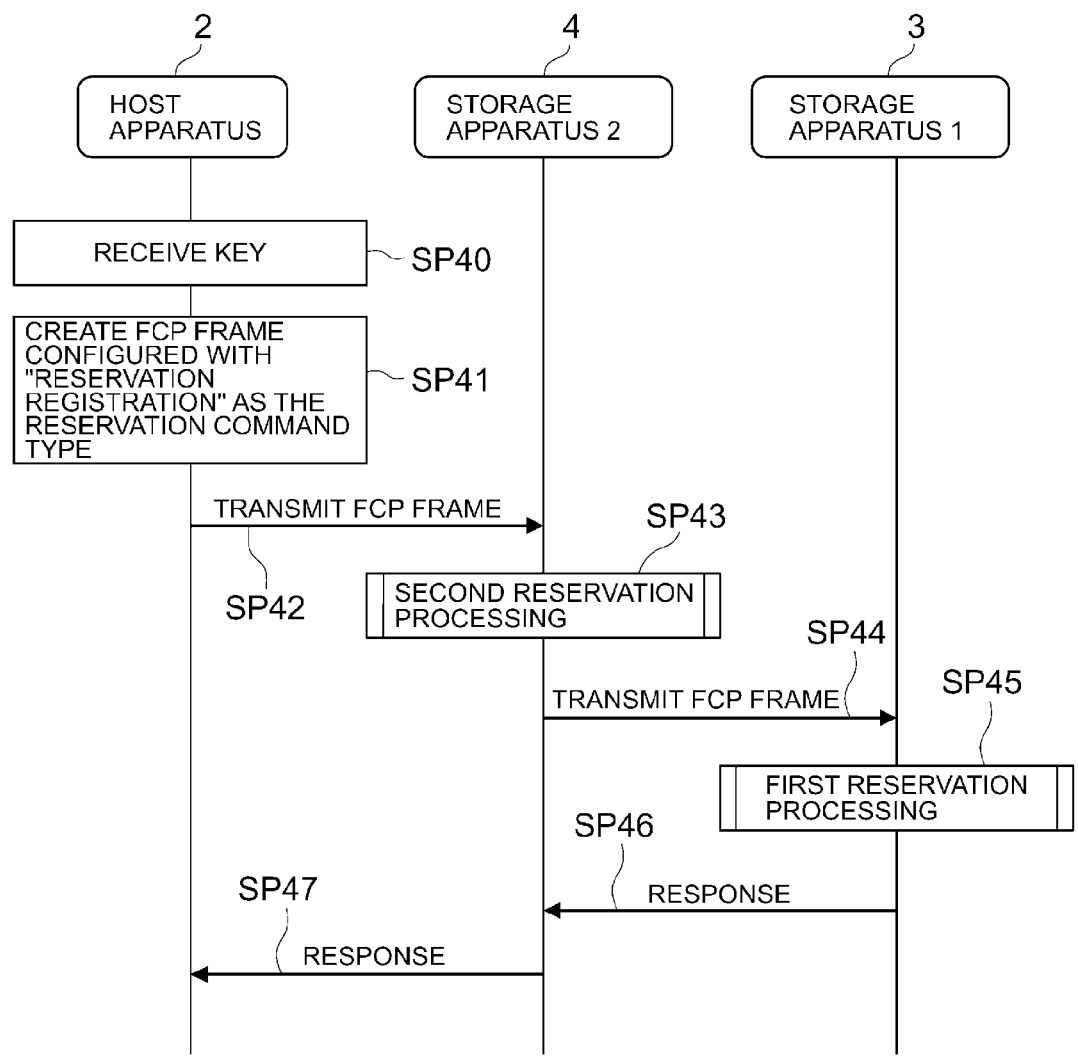
FIG. 12 is a sequence diagram serving to illustrate the flow of processing in a reservation phase.

(1-3-3) Various Processing of the Reservation Phase (1-3-3-1) Flow of Processing in the Reservation Phase FIG. 12 shows the flow of processing in the aforementioned reservation phase. This reservation phase is started as a result of the user using the host apparatus 2 to designate the volume number of the logical volume (hereinafter this is called the reservation target volume) VOL_A to be reserved in the first storage apparatus 3, and a key which is pre-configured for the reservation target volume VOL_A.

In addition, upon receiving this volume number and key (SP40), the host apparatus 2 creates the FCP volume 40 to the effect that the reservation target volume VOL_A is reserved using the key designated at this time (SP41).

More specifically, in this step SP41, the host apparatus 2 stores the volume number of the virtual volume VOL_B in the second storage apparatus 4 which is associated with the reservation target volume VOL_A designated by the user in the volume number field 40B, stores the initiator number, which is calculated on the basis of the WWN (host initiator WWN) of port 12B (FIG. 1) of the host apparatus 2 which is used by the host apparatus 2 when accessing the virtual volume VOL_B, in the initiator number field 40C, stores a target number, which is calculated on the basis of the WWN (target WWN) of port 27BB (FIG. 1) of the second storage apparatus 4 which is used when the host apparatus 2 accesses the virtual volume VOL_B, in the target number field 40D, configures "0" for the integrated management dedicated command flag, and creates an FCP frame 40 (FIG. 8) which is obtained by storing, in the SCSI command field 40F, a reservation command 41 (FIG. 9) which comprises the key configured for the reservation target volume VOL_A, the code which corresponds to the reservation command type called "reservation," and the host initiator WWN of the host apparatus 2.

Further, the host apparatus 2 subsequently transmits the FCP frame 40 created as mentioned earlier to the second storage apparatus 4 (SP42).

Upon receipt of this FCP frame 40, the second storage apparatus 4 registers the host initiator WWN, the initiator number and target number which are contained in the FCP frame 40 and the WWN (target WWN) of port 27BB of the second storage apparatus 4 which received the FCP frame 40, in the initiator target port-mapping information table 31 (FIG. 4) (SP43).

In addition, the second storage apparatus 4 stores the volume number of the reservation target volume in the first storage apparatus 3 in the volume number field 40B, stores the initiator number and target number which are registered in the initiator target port-mapping information table 31 in the initiator number field 40C and target number field 40D respectively, and creates an FCP frame 40 which is obtained by storing as is the reservation command 41 contained in the FCP frame 40 from the host apparatus 2 in the SCSI command field 40F (SP43). The second storage apparatus 4 subsequently transmits the FCP frame thus created to the first storage apparatus 3 (SP44).

Upon receipt of this FCP frame 40, the first storage apparatus 3 captures required information such as the key and host initiator WWN and so on from the FCP frame 40 and executes first reservation processing in which the reservation target volume VOL_A is reserved for the host apparatus 2 on the basis of the captured information (SP45).

When the first reservation processing is complete, the first storage apparatus 3 transmits a response to that effect to the second storage apparatus 4 (SP46). Furthermore, upon receiving this response, the second storage apparatus 4 transfers the response to the host apparatus 2 (SP47).

(1-3-3-2) Second Reservation Processing

Figure 13:
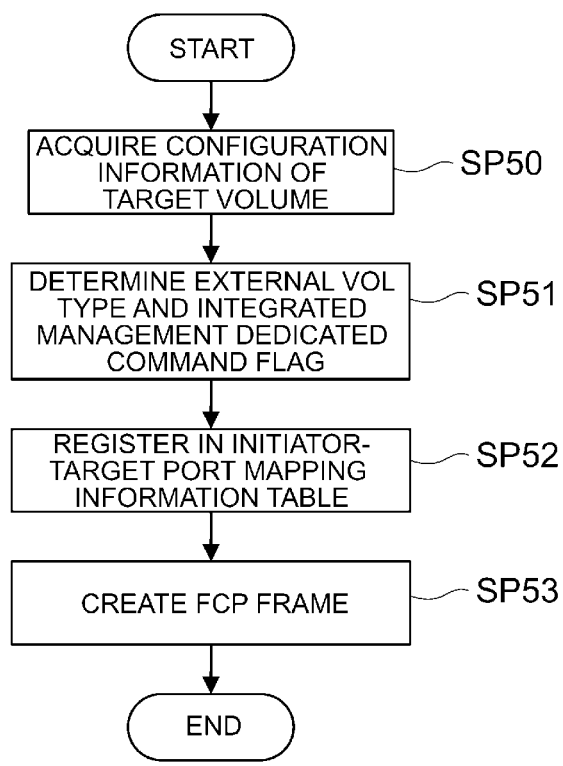
FIG. 13 is a flowchart showing a processing routine for second reservation processing.

Here, FIG. 13 shows the specific processing content of second reservation processing which is executed by the channel adapter 22B (FIG. 1) in the second storage apparatus 4 which receives the FCP frame 40 from the host apparatus 2 in step SP43 of the reservation phase.

Upon receiving the FCP frame 40 from the host apparatus 2, this channel adapter 22B starts the second reservation processing shown in FIG. 13, and first refers to the configuration information 30 (FIG. 3) stored in the shared memory 25B (FIG. 1) to acquire the external volume type of the logical volume which is targeted by the FCP frame 40 then received (here, the virtual volume VOL_B in the second storage apparatus 4 which is mapped to the reservation target volume VOL_A) (SP50).

Thereafter, the channel adapter 22B makes a determination of whether or not the external volume type acquired in step SP50 is "integrated management volume" and determines whether or not the value of the integrated management dedicated command flag stored in the FCP frame 40 is "0" (SP51).

Furthermore, if a determination is obtained in step SP51 that the external volume type of the logical volume targeted by the FCP frame 40 is "integrated management volume" and the value of the integrated management dedicated command flag contained in the FCP frame 40 is "0", the channel adapter 22B captures the host initiator WWN, initiator number and target number from the FCP frame 40 and registers this information in the initiator target port-mapping information table 31 in association with the WWN (target WWN) of the port 27BB (FIG. 1) of the second storage apparatus 4 which received the FCP frame 40 (SP52).

The channel adapter 22B subsequently creates an FCP frame 40 for transferring the reservation command 41 (FIG. 9) contained in the FCP frame 40 to the first storage apparatus 3 (SP53).

More specifically, the channel adapter 22B acquires the volume number of the logical volume (reservation target volume VOL_A) in the first storage apparatus 3, which is mapped to the logical volume (virtual volume VOL_B) targeted by the FCP frame 40 from the host apparatus 2, from the configuration information 30 (FIG. 3). Furthermore, the channel adapter 22B reads the initiator number and target number from the initiator target port-mapping information table 31. The channel adapter 22B then creates an FCP frame 40 which is obtained by storing the volume number of the thus acquired reservation target volume VOL_A, the initiator number and the target number in the volume number field 40B, the initiator number field 40C, and the target number field 40D respectively. Here, the channel adapter 22B configures "1" for the integrated management dedicated command flag of the FCP frame 40.

The channel adapter 22B subsequently terminates the second reservation processing. The FCP frame 40 thus created is subsequently transmitted to the first storage apparatus 3 in step SP44 of FIG. 12.

(1-3-3-3) First Reservation Processing

Figure 14:
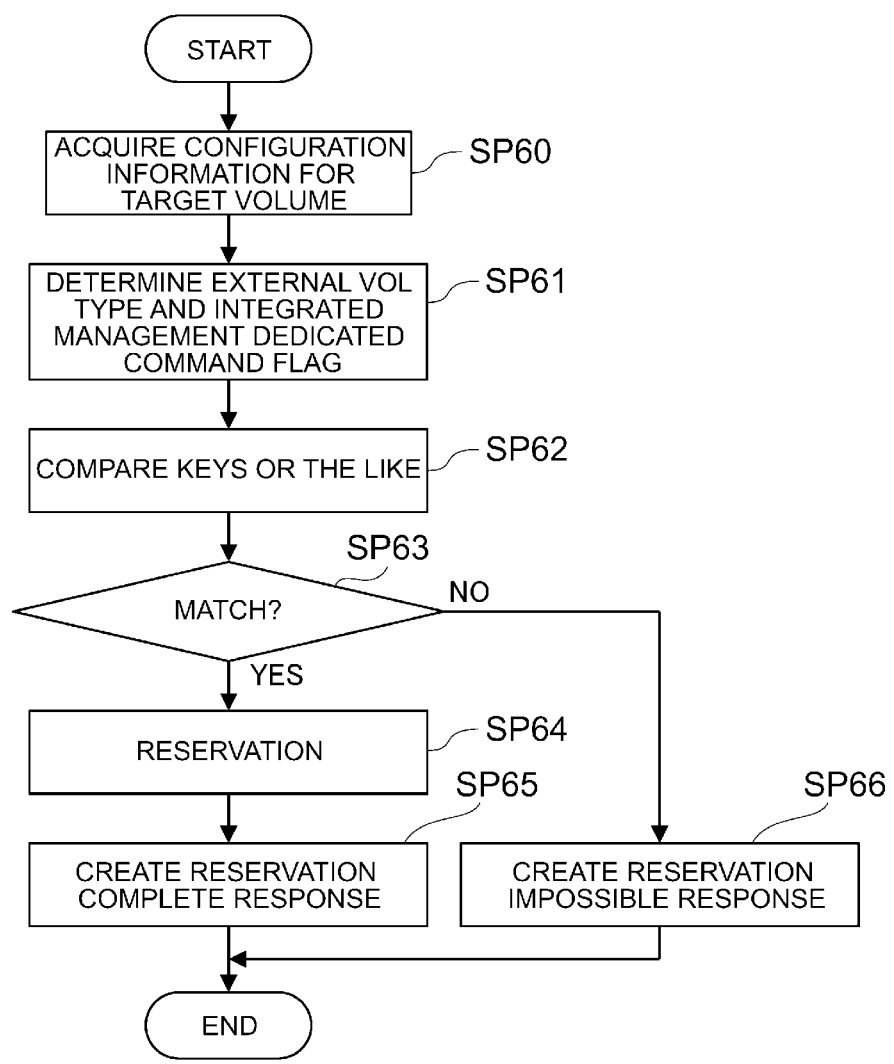
FIG. 14 is a flowchart showing a processing routine for first reservation processing.

FIG. 14 shows specific processing content of the first reservation processing which is executed by the channel adapter 22A (FIG. 1) in the first storage apparatus 3 which receives the aforementioned FCP frame 40 which is transmitted by the second storage apparatus 4 in step SP45 of the reservation phase (FIG. 12).

Upon receipt of this FCP frame 40, the channel adapter 22A starts the first reservation processing shown in FIG. 14 and first refers to the configuration information 32 (FIG. 3) stored in the shared memory 25A (FIG. 1) to acquire the external volume type of the logical volume (here this is the reservation target volume VOL_A) targeted by the FCP frame 40 (SP60).

The channel adapter 22A subsequently makes a determination of whether or not the external volume type acquired in step SP60 is "internal volume" and determines whether or not the value of the integrated management dedicated command flag contained in the FCP frame 40 is "1" (SP61).

Further, if the channel adapter 22A obtains a determination in step SP61 that the external volume type of the logical volume targeted by the FCP frame 40 is "internal volume" and the value of the integrated management dedicated command flag contained in the FCP frame 40 is "1," the channel adapter 22A captures the initiator number, target number, key information and host initiator WWN from the FCP frame 40 and compares the captured information with the initiator number, target number, key and host initiator WWN which are contained in the reservation information 33 (FIG. 5) of the reservation target volume VOL_A (SP62).

Furthermore, the channel adapter 22A determines in step SP63 whether there is a complete match between the initiator number, target number, key and host initiator WWN which are captured from the FCP frame 40, and the initiator number, target number, key and host initiator WWN which are contained in the reservation information 33 of the reservation target volume VOL_A (SP63).

If a negative result is obtained in this determination, the channel adapter 22A creates a response to the effect that the designated reservation target volume VOL_A cannot be reserved (SP66) and subsequently terminates the first reservation processing.

If, however, an affirmative result is obtained in the determination of step SP63, the channel adapter 22A reserves the reservation target volume VOL_A for the host apparatus 2 by configuring a flag to the effect that the reservation target volume VOL_A has been reserved in the reservation information 33 of the reservation target volume VOL_A (SP64).

Further, the channel adapter 22A creates a response to the effect that the reservation target volume VOL_A has been reserved (SP65) and subsequently terminates the first reservation processing. Accordingly, a response which is then created in step SP65 or step SP66 is transmitted to the second storage apparatus 4 in step SP45 in FIG. 12.

(1-3-4) Various Processing of the Data Transfer Phase

(1-3-4-1) Flow of Processing of the Data Transfer Phase

Figure 15:
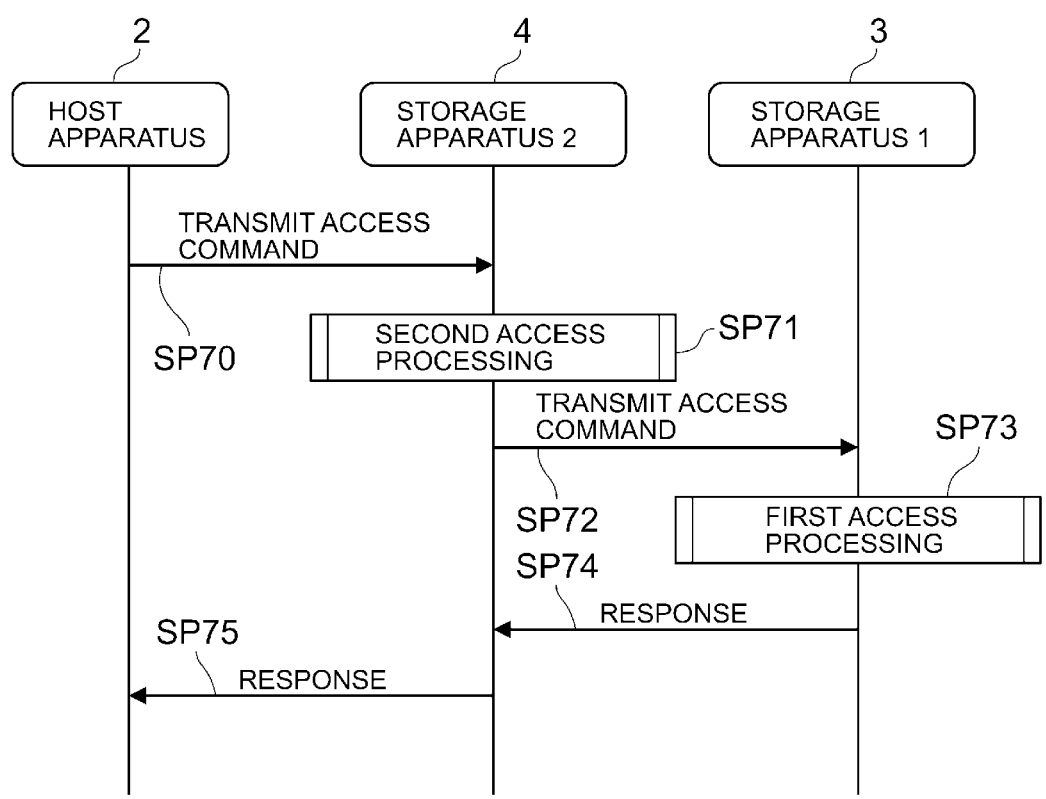
FIG. 15 is a sequence diagram serving to illustrate the flow of processing in a data transfer phase.

FIG. 15 shows the flow of processing of the aforementioned data transfer phase. In this data transfer phase, the host apparatus 2 transmits an FCP frame 40 which is obtained by storing an SCSI access command (read command or write command) in the SCSI command field 40F (FIG. 8) to the second storage apparatus 4 (SP70).

In the FCP frame 40 which is transmitted to the second storage apparatus 4 by the host apparatus 2 at this time, the volume number of the virtual volume VOL_B in the second storage apparatus 4 which is associated with the logical volume (hereinafter this will be called the access target volume) in the first storage apparatus 3 serving as the access target is stored in the volume number field 40B, an initiator number which is calculated on the basis of the WWN (host initiator WWN) of the port 12B (FIG. 1) in the host apparatus 2 used when the host apparatus 2 accesses the virtual volume VOL_B is stored in the initiator number field 40C, a target number, which is calculated on the basis of the WWN (target WWN) of port 27BB (FIG. 1) of the second storage apparatus 4 used when the host apparatus 2 accesses the virtual volume VOL_B, is stored in the target number field 40D, the integrated management dedicated command flag is configured as "0", and an SCSI command (read command or write command) is stored in the SCSI command field 40F.

Upon receiving this FCP frame 40, the second storage apparatus 4 registers the host initiator WWN, initiator number, and target number which are contained in the FCP frame 40 in the initiator target port-mapping information table 31 (FIG. 4) together with the WWN (target WWN) of port 27BB of the second storage apparatus 4 which received the FCP frame 40 (SP71).

Furthermore, the second storage apparatus 4 stores the volume number of the access target volume VOL_A in the first storage apparatus 3 in the volume number field 40B, stores the initiator number and target number registered in the initiator target port-mapping information table 31 in the initiator number field 40C and the target number field 40D respectively, creates an FCP frame 40 is obtained by storing as is the reservation command 41 (FIG. 9) contained in the FCP frame 40 from the host apparatus 2 in the SCSI command field 40F (SP71), and transmits the FCP frame 40 to the first storage apparatus 3 (SP72).

Upon receipt of the FCP frame 40, the first storage apparatus 3 executes first access processing according to the SCSI command which is contained in the FCP frame 40 (SP73). Upon completion of the first access processing, the first storage apparatus 3 transmits this response to the second storage apparatus 4 (SP74). Furthermore, upon receiving this response, the second storage apparatus 4 transfers the response to the host apparatus 2 (SP75).

(1-3-4-2) Second Access Processing

Figure 16:
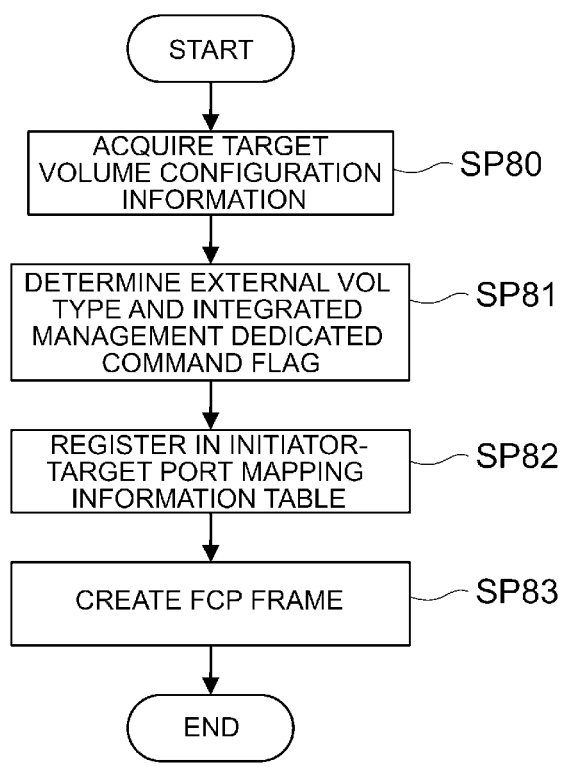
FIG. 16 is a flowchart showing a processing routine for second access processing.

Here, FIG. 16 shows the specific processing content of the second access processing which is executed by the channel adapter 22B (FIG. 1) in the second storage apparatus 4 which received the FCP frame 40 from the host apparatus 2 in step SP71 of the data transfer phase.

Upon receiving the FCP frame 40 from the host apparatus 2, this channel adapter 22B starts second access processing shown in FIG. 16 and first refers to the configuration information 30 stored in the shared memory 25B (FIG. 1) to acquire the external volume type of the logical volume which is targeted by the FCP frame 40 then received (here, the virtual volume VOL_B in the second storage apparatus 4 which is mapped to the access target volume VOL_A) (SP80).

Thereafter, the channel adapter 22B makes a determination of whether or not the external volume type acquired in step SP80 is "integrated management volume" and determines whether or not the value of the integrated management dedicated command flag in the FCP frame 40 is "0" (SP81).

Further, if a determination is obtained in step SP81 that the external volume type of the logical volume targeted by the FCP frame 40 is "integrated management volume" and the value of the integrated management dedicated command flag in the FCP frame 40 is "0", the channel adapter 22B captures the host initiator WWN, initiator number and target number from the FCP frame 40 and registers this information in the initiator target port-mapping information table 31 (FIG. 4) in association with the WWN (target WWN) of the port 27BB (FIG. 1) of the second storage apparatus 4 which received the FCP frame 40 (SP82).

The channel adapter 22B subsequently creates an FCP frame 40 for transmitting an SCSI command (read command or write command) which is stored in the FCP frame 40 together with the initiator number and target number from the receiving host apparatus 2 to the first storage apparatus 3 (SP83).

More specifically, the channel adapter 22B acquires the volume number of the logical volume (access target volume VOL_A) in the first storage apparatus 3, which is mapped to the logical volume (virtual volume VOL_B) targeted by the FCP frame 40 from the host apparatus 2, from the configuration information 30 (FIG. 3). Furthermore, the channel adapter 22B reads the initiator number and target number from the initiator target port-mapping information table 31. The channel adapter 22B then creates an FCP frame 40 which is obtained by storing the volume number of the thus acquired access target volume VOL_A, the initiator number and the target number in the volume number field 40B, the initiator number field 40C, and the target number field 40D respectively.

Here, the channel adapter 22B configures "1" for the integrated management dedicated command flag of the created FCP frame 40 and stores the SCSI command contained in the FCP frame 40 from the host apparatus 2 in the SCSI command field 40F.

The channel adapter 22B subsequently terminates the second access processing. Accordingly, the FCP frame 40 thus created is subsequently transmitted to the first storage apparatus 3 in step SP72 of FIG. 15.

(1-3-4-3) First Access Processing

Figure 17:
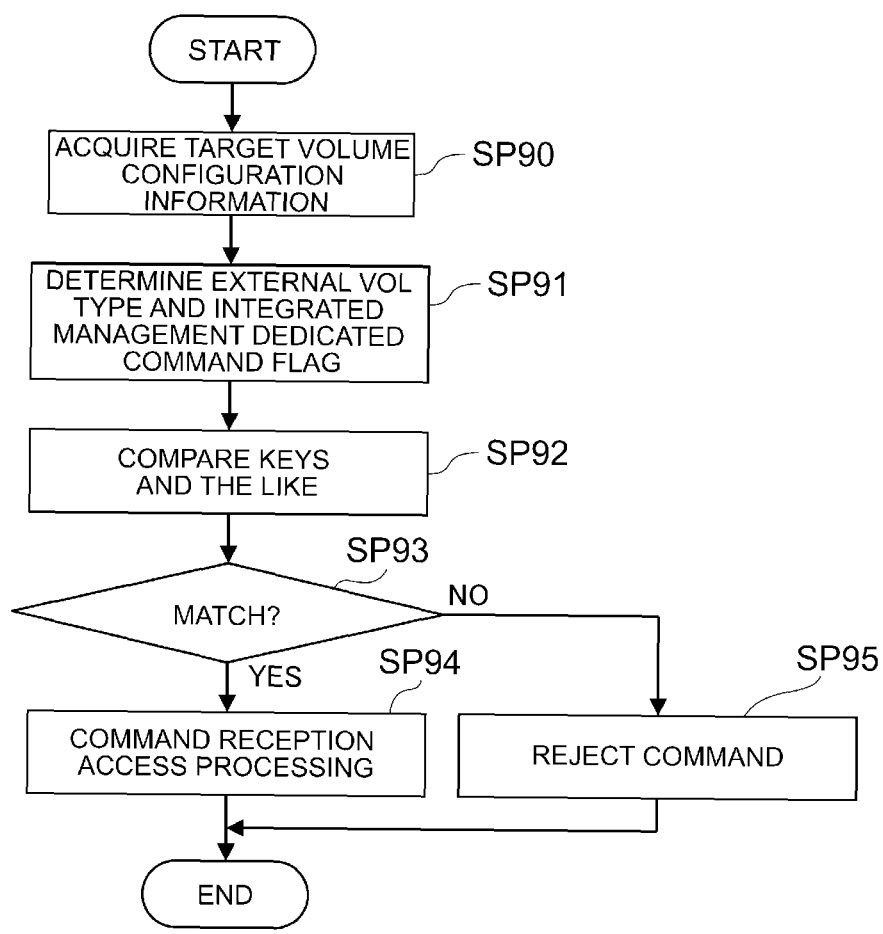
FIG. 17 is a flowchart showing a processing routine for first access processing.

FIG. 17 shows specific processing content for first access processing which is executed by the channel adapter 22A (FIG. 1) in the first storage apparatus 3 which receives the aforementioned FCP frame 40 which is transmitted by the second storage apparatus 4 in step SP73 of the data transfer phase (FIG. 15).

Upon receipt of this FCP frame 40, the channel adapter 22A starts the first access processing shown in FIG. 17 and first refers to the configuration information 32 (FIG. 3) stored in the shared memory 25A (FIG. 1) to acquire the external volume type of the logical volume (here this is the access target volume VOL_A) targeted by the FCP frame 40 (SP90).

The channel adapter 22A subsequently makes a determination of whether or not the external volume type acquired in step SP90 is "internal volume" and determines whether or not the value of the integrated management dedicated command flag in the FCP frame 40 is "1" (SP91).

Further, if the channel adapter 22A obtains a determination in step SP91 that the external volume type of the logical volume targeted by the FCP frame 40 is "internal volume" and the value of the integrated management dedicated command flag contained in the FCP frame 40 is "1," the channel adapter 22A captures the initiator number and target number from the FCP frame 40 and compares the captured information with the initiator number and target number which are contained in the reservation information 33 (FIG. 5) of the access target volume VOL_A (SP92).

Furthermore, the channel adapter 22A determines, in the comparison of step SP92, whether or not there is a match between both the initiator number and target number captured from the FCP frame 40 and the initiator number and target number which are registered in the reservation information 33 of the access target volume VOL_A (SP93). Further, if an affirmative result is obtained in this determination, after receiving the FCP frame 40 which is received at this time and executing access processing (read processing or write processing) which is designated in the FCP frame 40, the channel adapter 22A creates a response to that effect (SP94). Further, the channel adapter 22A subsequently terminates the first access processing.

If, on the other hand, a negative result is obtained in the determination of step SP93, the channel adapter 22A rejects the reception of the FCP frame 40 received at this time and creates a response to that effect (SP95). Further, the channel adapter 22A subsequently terminates the first access processing.

Accordingly, the response which is then created in step SP94 or SP95 is transmitted to the second storage apparatus 4 in step SP74 in FIG. 15.

Figure 18:
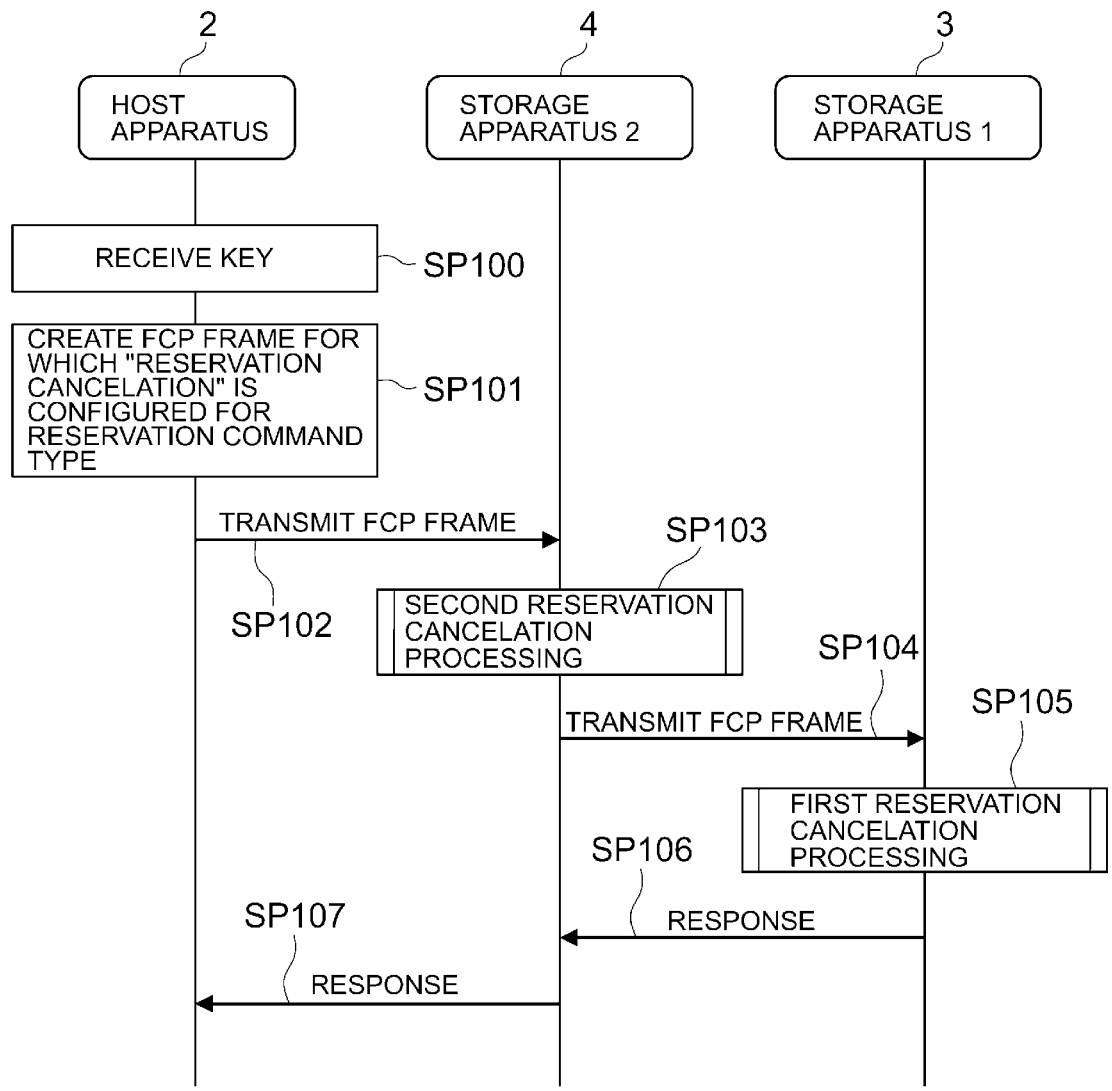
FIG. 18 is a sequence diagram serving to illustrate the flow of processing in a reservation cancelation phase.

(1-3-5) Various Processing of the Reservation Cancelation Phase (1-3-5-1) Flow of processing in the Reservation Cancelation Phase FIG. 18 shows the flow of processing in the aforementioned reservation cancelation phase. This reservation cancelation phase is started as a result of the user using the host apparatus 2 to designate the volume number of the logical volume (hereinafter this is called the reservation cancelation target volume) VOL_A in the first storage apparatus 3 whose reserved state is to be canceled, and a key which is pre-registered for the reservation cancelation target volume VOL_A.

In addition, upon receiving this volume number and key (SP100), the host apparatus 2 creates an FCP volume 40 to the effect that the reserved state of the reservation cancelation target volume VOL_A is to be canceled by means of the key designated at this time (SP101).

More specifically, in this step SP101, the host apparatus 2 stores the volume number of the virtual volume VOL_B in the second storage apparatus 4 which is associated with the reservation cancelation target volume VOL_A designated by the user in the volume number field 40B, stores the initiator number, which is calculated on the basis of the WWN (host initiator WWN) of a port of the host apparatus 2 which is used by the host apparatus 2 when accessing the virtual volume VOL_B, in the initiator number field 40C, stores a target number, which is calculated on the basis of the WWN (target WWN) of a port of the second storage apparatus 4 which is used when the host apparatus 2 accesses the virtual volume VOL_B, in the target number field 40D, configures "0" for the integrated management dedicated command flag, and creates an FCP frame 40 which is obtained by storing, in the SCSI command field 40F, a reservation command 41 (FIG. 9) which comprises the key configured for the reservation cancelation target volume VOL_A, the code which corresponds to the reservation command type called "reservation cancelation," and the host initiator WWN of the host apparatus 2.

Further, the host apparatus 2 subsequently transmits the FCP frame 40 created as mentioned earlier to the second storage apparatus 4 (SP102).

Upon receipt of this FCP frame 40, the second storage apparatus 4 registers the host initiator WWN, the initiator number and target number which are contained in the FCP frame 40 and the WWN (target WWN) of port 27BB of the second storage apparatus 4 which received the FCP frame 40, in the initiator target port-mapping information table 31 (FIG. 4) (SP103).

In addition, the second storage apparatus 4 subsequently stores the volume number of the reservation cancelation target volume VOL_A in the first storage apparatus 3 in the volume number field 40B, stores the initiator number and target number which are registered in the initiator target port-mapping information table 31 in the initiator number field 40C and target number field 40D respectively, and creates an FCP frame 40 which is obtained by storing as is the reservation command 41 contained in the FCP frame 40 from the host apparatus 2 in the SCSI command field 40F (SP103). The second storage apparatus 4 subsequently transmits the FCP frame 40 thus created to the first storage apparatus 3 (SP104).

Upon receipt of this FCP frame 40, the first storage apparatus 3 captures required information such as the key and host initiator WWN and so on from the FCP frame 40 and executes first reservation cancelation processing in which the reserved state of the reservation cancelation target volume VOL_A is canceled on the basis of the captured information (SP105).

When the first reservation cancelation processing is complete, the first storage apparatus 3 transmits a response to that effect to the second storage apparatus 4 (SP106). Furthermore, upon receiving this response, the second storage apparatus 4 transfers the response to the host apparatus 2 (SP107).

(1-3-5-2) Second Reservation Cancelation Processing

Figure 19:
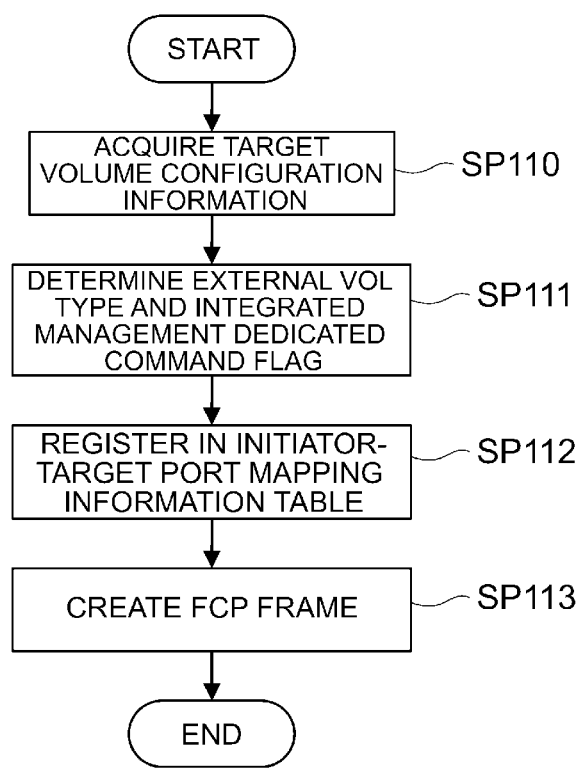
FIG. 19 is a flowchart showing a processing routine for second reservation cancelation processing.

Here, FIG. 19 shows specific processing content of second reservation cancelation processing which is executed by the channel adapter 22B (FIG. 1) in the second storage apparatus 4 which receives the FCP frame 40 from the host apparatus 2 in step SP103 of the reservation cancelation phase.

Upon receiving the FCP frame 40 from the host apparatus 2, the channel adapter 22B starts the second reservation cancelation processing shown in FIG. 19 and first refers to the configuration information 30 (FIG. 3) which is stored in the shared memory 25B (FIG. 1) to acquire the external volume type of the logical volume which is targeted by the FCP frame 40 received at this time (here this is the virtual volume VOL_B in the second storage apparatus 4 which is mapped to the reservation cancelation target volume VOL_A) (SP110).

The channel adapter 22B subsequently makes a determination makes of whether or not the external volume type acquired in step SP110 is "integrated management volume" and determines whether or not the value of the integrated management dedicated command flag stored in the FCP frame 40 is "0" (SP111).

Further, if the channel adapter 22B obtains a determination in step SP111 that the external volume type of the logical volume targeted by the FCP frame 40 is "integrated management volume" and the value of the integrated management dedicated command flag contained in the FCP frame 40 is "0," the channel adapter 22B captures the host initiator WWN, the initiator number, and the target number from the FCP frame 40 and registers this information in the initiator target port-mapping information table 31 in association with the WWN (target WWN) of port 27BB (FIG. 1) of the second storage apparatus 4 which received the FCP frame 40 (SP112).

The channel adapter 22B subsequently creates an FCP frame 40 for transmitting a reservation command 41 (FIG. 9) which is contained in the FCP frame 40 to the first storage apparatus 3 (SP113).

More specifically, the channel adapter 22B acquires the volume number of the logical volume (reservation cancelation target volume VOL_A) in the first storage apparatus 3, which is mapped to the logical volume (virtual volume VOL_B) targeted by the FCP frame 40 from the host apparatus 2, from the configuration information 30 (FIG. 3). Furthermore, the channel adapter 22B reads the initiator number and target number from the initiator target port-mapping information table 31. The channel adapter 22B then creates an FCP frame 40 which is obtained by storing the volume number of the thus acquired reservation cancelation target volume VOL_A, the initiator number and the target number in the volume number field 40B, the initiator number field 40C, and the target number field 40D respectively. Here, the channel adapter 22B configures "1" for the integrated management dedicated command flag of the created FCP frame 40.

The channel adapter 22B subsequently terminates the second reservation cancelation processing. Accordingly, the FCP frame 40 thus created is subsequently transmitted to the first storage apparatus 3 in step SP104 of FIG. 18.

(1-3-5-3) First Reservation Cancelation Processing

Figure 20:
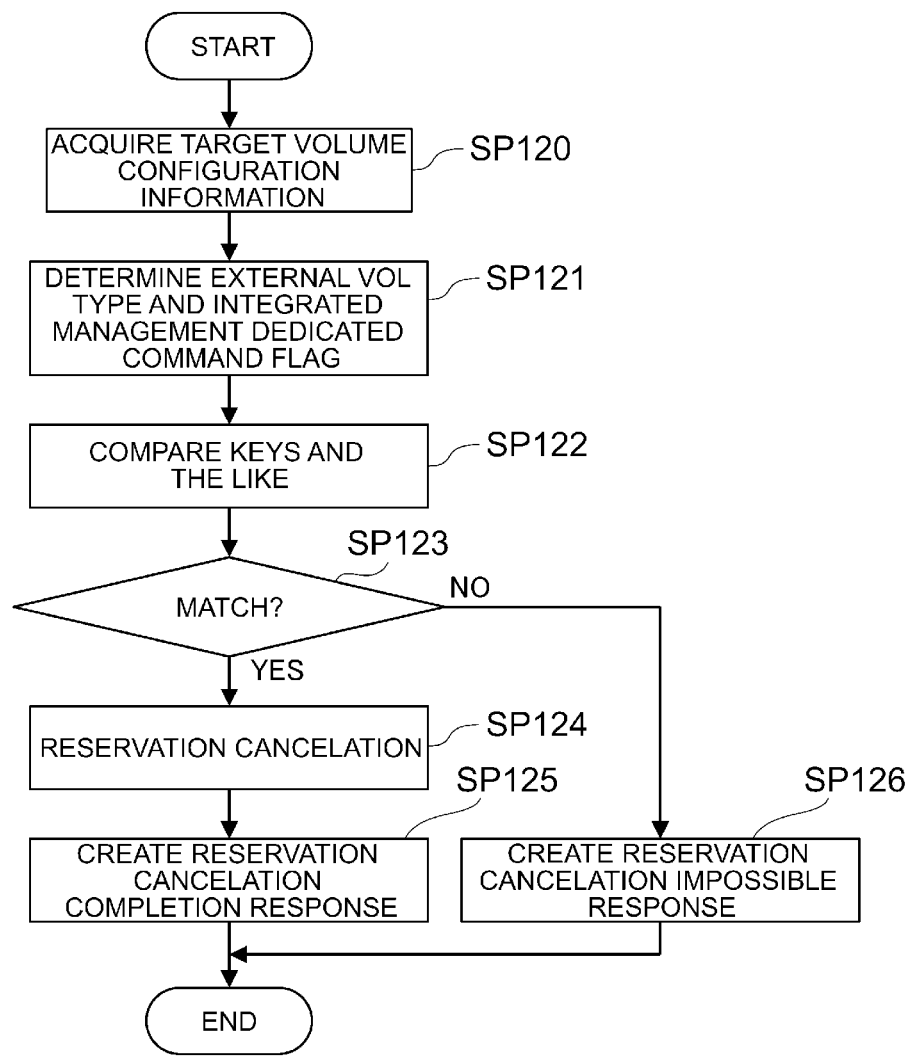
FIG. 20 is a flowchart showing a processing routine for first reservation cancelation processing.

FIG. 20 shows specific processing content of the first reservation cancelation processing which is executed by the channel adapter 22A (FIG. 1) in the first storage apparatus 3 which receives the aforementioned FCP frame 40 which is transmitted by the second storage apparatus 4 in step SP105 of the reservation cancelation phase (FIG. 18).

Upon receipt of this FCP frame 40, the channel adapter 22A starts the first reservation cancelation processing shown in FIG. 20 and first refers to the configuration information 32 (FIG. 3) stored in the shared memory 25A (FIG. 1) to acquire the external volume type of the logical volume (here this is the reservation cancelation target volume VOL_A) targeted by the FCP frame 40 (SP120).

The channel adapter 22A subsequently makes a determination of whether or not the external volume type acquired in step SP120 is "internal volume" and determines whether or not the value of the integrated management dedicated command flag in the FCP frame 40 is "1" (SP121).

Further, if the channel adapter 22A obtains a determination in step SP121 that the external volume type of the logical volume targeted by the FCP frame 40 is "internal volume" and the value of the integrated management dedicated command flag in the FCP frame 40 is "1," the channel adapter 22A captures the respective information on the initiator number, target number, key information and host initiator WWN from the FCP frame 40 and compares the captured information with the initiator number, target number, key and host initiator WWN which are contained in the reservation information 33 of the reservation cancelation target volume VOL_A (SP122).

Furthermore, the channel adapter 22A determines in step SP122 whether there is a complete match between the initiator number, target number, key and host initiator WWN which are captured from the FCP frame 40, and the initiator number, target number, key and host initiator WWN which are contained in the reservation information 33 of the reservation target volume VOL_A (SP123).

If a negative result is obtained in this determination, the channel adapter 22A creates a response to the effect that the reserved state of the designated reservation cancelation target volume VOL_A cannot be canceled (SP126) and subsequently terminates the first reservation cancelation processing.

If, however, an affirmative result is obtained in the determination of step SP123, the channel adapter 22A cancels the reserved state of the reservation cancelation target volume VOL_A (SP124), creates a response to the effect that the reserved state of the reservation cancelation target volume VOL_A has been canceled (SP125) and subsequently terminates the first reservation cancelation processing.

Accordingly, a response which is then created in step SP125 or step SP126 is transmitted to the second storage apparatus 4 in step SP106 in FIG. 18.

(1-4) Reservation Information Migration Function (1-4-1) Flow of Series of Processes Relating to the Reservation Information Migration Function The reservation information migration function installed on the computer system 1 according to this embodiment will be described next.

As a result of the foregoing integrated management function being used in this computer system 1, data stored in the first storage apparatus 3 can be migrated to the second storage apparatus 4 without halting access by the host apparatus 2 to this data. Thus, by using this integrated management function, the existing first storage apparatus 3 can be replaced with a new second storage apparatus 4 without halting access by the host apparatus 2 to this data.

Figure 21:
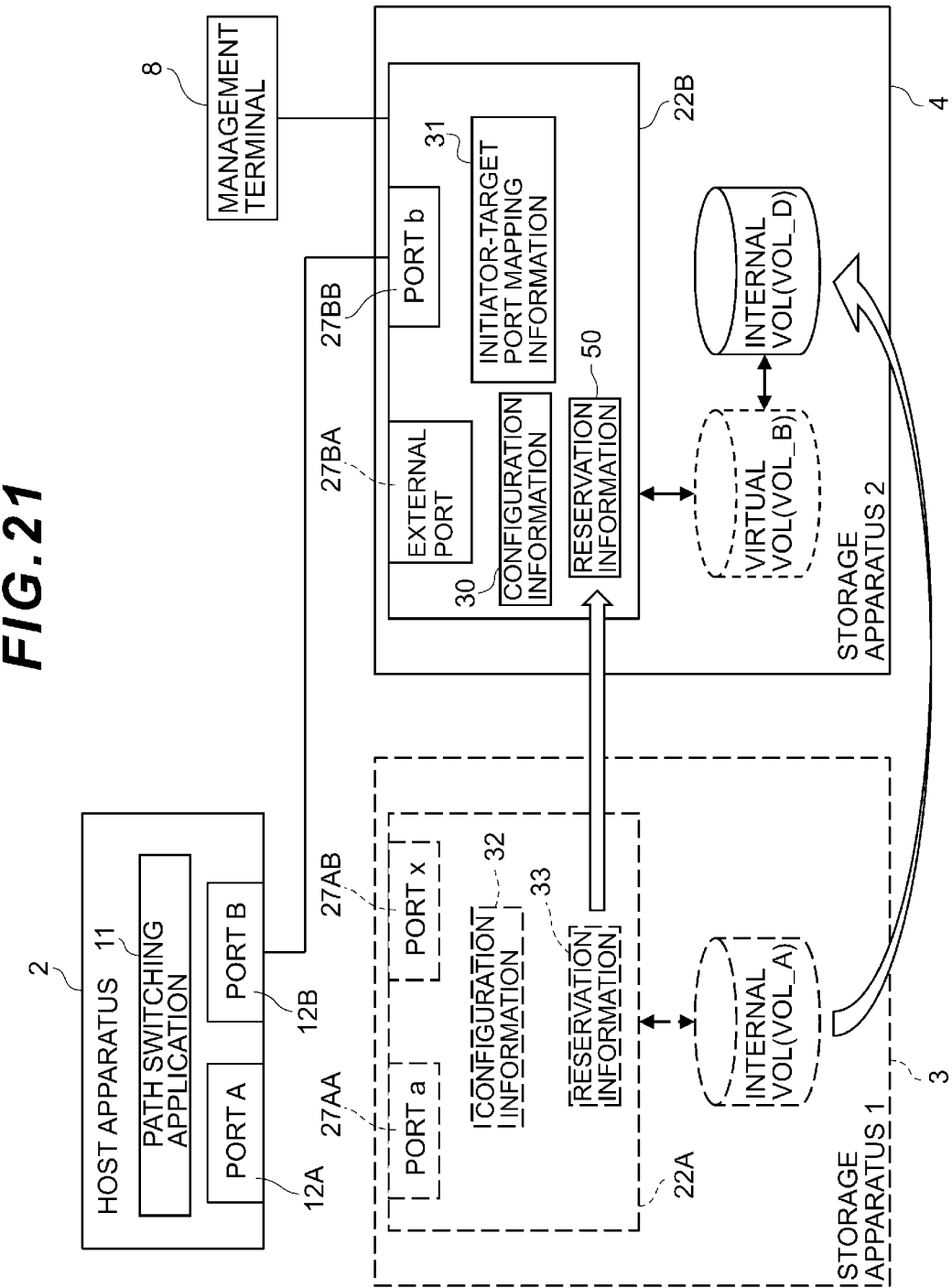
FIG. 21 is a conceptual view serving to illustrate a reservation information migration function.

In reality, if the first storage apparatus 3 is replaced with the second storage apparatus 4, as shown in FIG. 21, the virtual volumes VOL_B are created in the second storage apparatus 4 in association with each of the logical volumes VOL_A provided in the first storage apparatus 3, and the virtual volumes VOL_B are mapped to the corresponding logical volumes VOL_A respectively in the first storage apparatus 3.

Furthermore, the logical volumes VOL_B are created in association with each of the virtual volumes VOL_B in the second storage apparatuses 3, and the corresponding virtual volumes VOL_B are mapped respectively to these logical volumes VOL_D. In addition, the data stored in each of the logical volumes VOL_A in the first storage apparatus 3 is copied to corresponding logical volumes VOL_D in the second storage apparatus 4. Furthermore, mapping of the virtual volumes VOL_B in the second storage apparatus 4 to the logical volumes VOL_A in the first storage apparatus 3 is subsequently canceled.

As of the result of the foregoing procedure, data in the first storage apparatus 3 can be migrated to the second storage apparatus 4 without halting access by the host apparatus 2 and the first storage apparatus 3 can subsequently be removed.

However, according to the foregoing method, because the reservation information 33 of each logical volume VOL_A held by the first storage apparatus 3 is not migrated to the second storage apparatus 4, there is a problem in that the foregoing access restrictions using this reservation information 33 can no longer be imposed after replacing the first storage apparatus 3 with the second storage apparatus 4.

Therefore, if the mapping of the virtual volume VOL_B in the second storage apparatus 4 to the logical volume VOL_A in the first storage apparatus 3 is canceled, the computer system 1 has a reservation information migration function installed which accordingly automatically migrates the reservation information 33 relating to the logical volume VOL_A held by the first storage apparatus 3 to the second storage apparatus 4.

Figure 22:
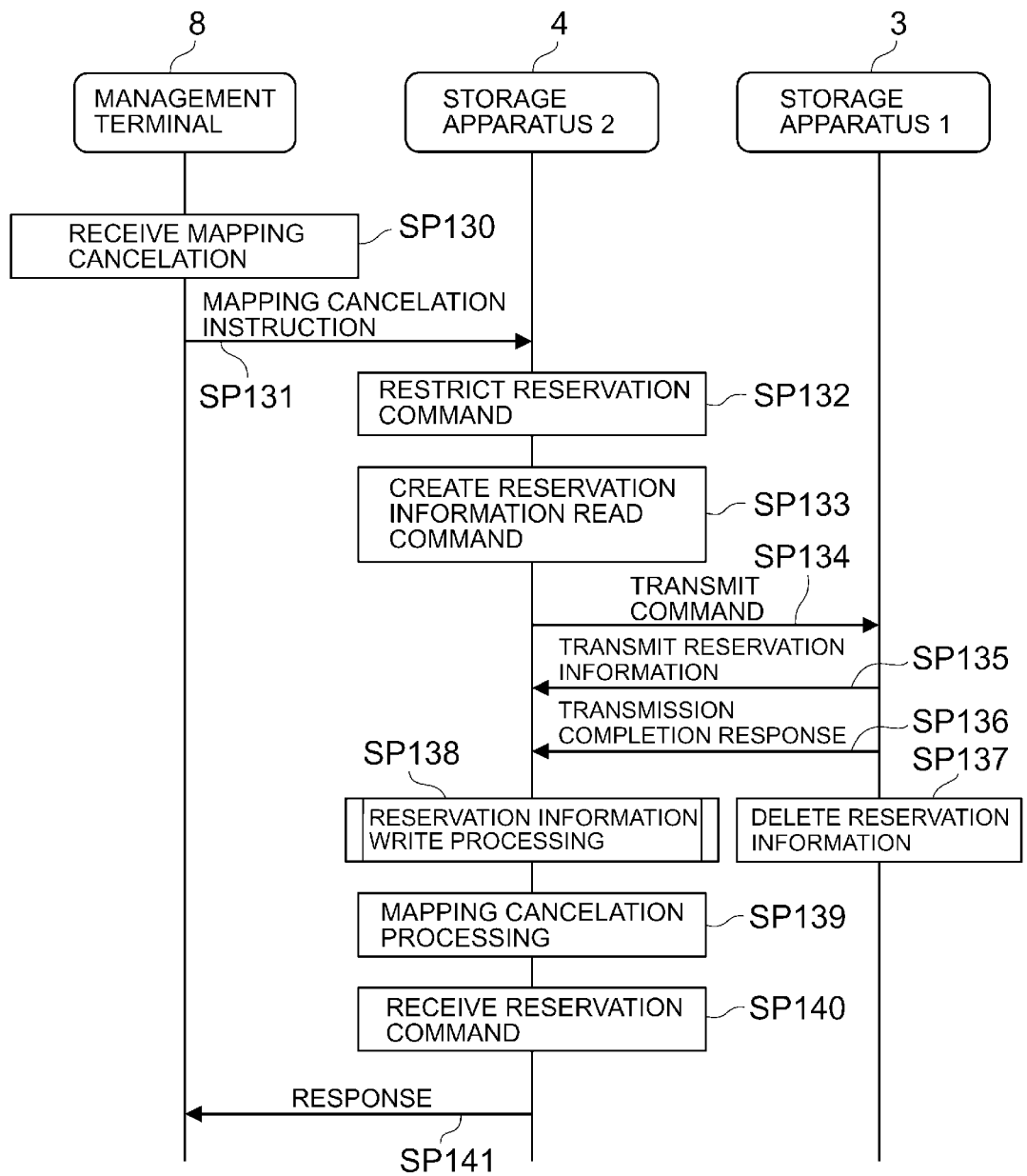
FIG. 22 is a sequence diagram serving to illustrate the flow of processing in reservation information migration processing.

FIG. 22 shows the flow of a series of processes of the reservation information migration processing which is executed by the computer system 1 relating to the reservation information migration function. The reservation information migration processing is started as a result of the system administrator designating the logical volume in the first storage apparatus and an instruction to cancel the mapping of the virtual volume in the second storage apparatus to these logical volumes to the management terminal 8.

Furthermore, upon receiving this mapping cancelation command (SP130), the management terminal 8 supplies an instruction corresponding to this command (hereinafter this will be called a mapping cancelation instruction) to the second storage apparatus 4 (SP131).

When this mapping cancelation command is supplied, the second storage apparatus 4 shifts to operation mode (hereinafter this is called the command reception rejection mode) which rejects reception of the FCP frame 40 by the host apparatus 2 to the logical volume VOL_A in the first storage apparatus 3 (SP132).

Furthermore, the second storage apparatus 4 creates a command for reading reservation information 33 for the logical volume VOL_A in the first storage apparatus 3 to which the virtual volume VOL_B in the storage apparatus itself is mapped from the first storage apparatus 3 (SP133). More specifically, the second storage apparatus 4 refers to the configuration information 30 stored in the shared memory 25B (FIG. 1), stores the volume number of the mapping-source logical volume VOL_A of the virtual volume VOL_B in the volume number field 40B of the foregoing FCP frame 40 illustrated in FIG. 8, stores a predetermined first code ("FFFF" in this embodiment) in the initiator number field 40C, stores a predetermined second code ("FFFF" in this embodiment) in the target number field 40D, and creates the FCP frame 40 which is configured with "1" as an integrated management dedicated command flag. The second storage apparatus 4 then transmits this FCP frame 40 to the first storage apparatus 3 (SP134).

However, the first storage apparatus 3 which receives this FCP frame 40 transmits all the reservation information 33 registered for the logical volume VOL_A in which the volume number is stored in the volume number field 40B of the FCP frame 40 to the second storage apparatus 4 (SP135). Furthermore, when the transmission to the second storage apparatus 4 of this reservation information 33 is complete, the first storage apparatus 3 transmits a response to that effect (hereinafter this is called a reservation information transmission completion response) to the second storage apparatus 4 (SP136), and deletes the reservation information 33 transmitted to the second storage apparatus 4 from the shared memory 25A (FIG. 1) of all the storage apparatuses (SP137).

Meanwhile, the second storage apparatus 4 which receives a reservation information 33 from the first storage apparatus 3 executes reservation information rewriting processing which rewrites this reservation information 33 with the reservation information 33 for the virtual volume VOL_B in the second storage apparatus 4 (SP138), and subsequently cancels the mapping of the virtual volume VOL_B to the corresponding logical volume VOL_A in the first storage apparatus 3 (SP139).

Furthermore, the second storage apparatus 4 shifts the operating mode from the command reception rejection mode which was migrated in step SP132 to normal operation mode in which a command from the host apparatus 2 is received (SP140), and subsequently transmits a response to the effect that the designated mapping cancelation processing is complete (mapping cancelation completion response) to the management terminal 8 (SP141).

(1-4-2) Reservation Information Rewriting Processing

Figure 23:
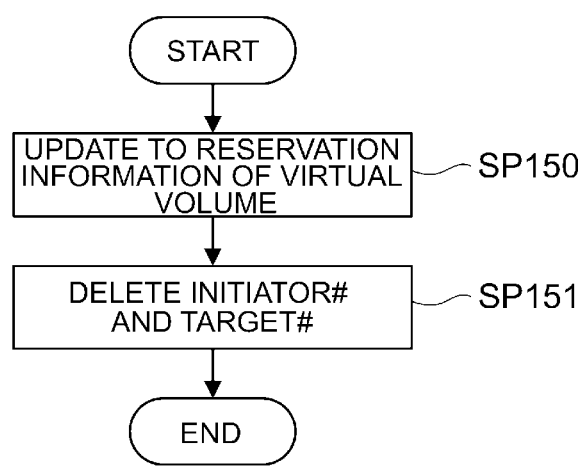
FIG. 23 is a flowchart showing a processing routine for reservation information rewriting processing.

Here, FIG. 23 shows specific processing content of reservation information rewriting processing which is executed by the channel adapter 22B (FIG. 1) in the second storage apparatus 4 in step SP138 of the aforementioned reservation information migration processing for FIG. 22.

Upon advancing to step SP138 of the reservation information migration processing, this channel adapter 22B starts the reservation information rewriting processing shown in FIG. 23 and first rewrites reservation information 33 transmitted from the first storage apparatus 3 from the reservation information 33 for the logical volume VOL_A associated with a corresponding port 27AA (FIG. 1) in the first storage apparatus 3 to reservation information for this virtual volume VOL_B in the second storage apparatus 4 (SP150).

The channel adapter 22B subsequently deletes the initiator number and target number respectively from reservation information 50 (FIG. 21) thus obtained (SP151) and then terminates the reservation information rewriting processing.

(1-5) Effect of the Embodiment

In a computer system 1 according to the embodiment described above, when the host apparatus 2 accesses the logical volume VOL_A in the first storage apparatus 3 via the second storage apparatus 4, path information relating to a path extending to the virtual volume VOL_B in the second storage apparatus 4 from the host apparatus 2 is stored in the FCP frame 40 from the second storage apparatus 4 to the first storage apparatus 3, and since the first storage apparatus 3 only allows access when there is a match between the path information pre-registered for the logical volume VOL_A and the path information contained in the FCP frame 40 received at the time, access restrictions can be imposed so that only the host apparatus 2 which reserved the logical volume VOL_A is able to access the logical volume VOL_A. It is thus possible to gradually improve the security and reliability of the computer system 1.

Figure 24:
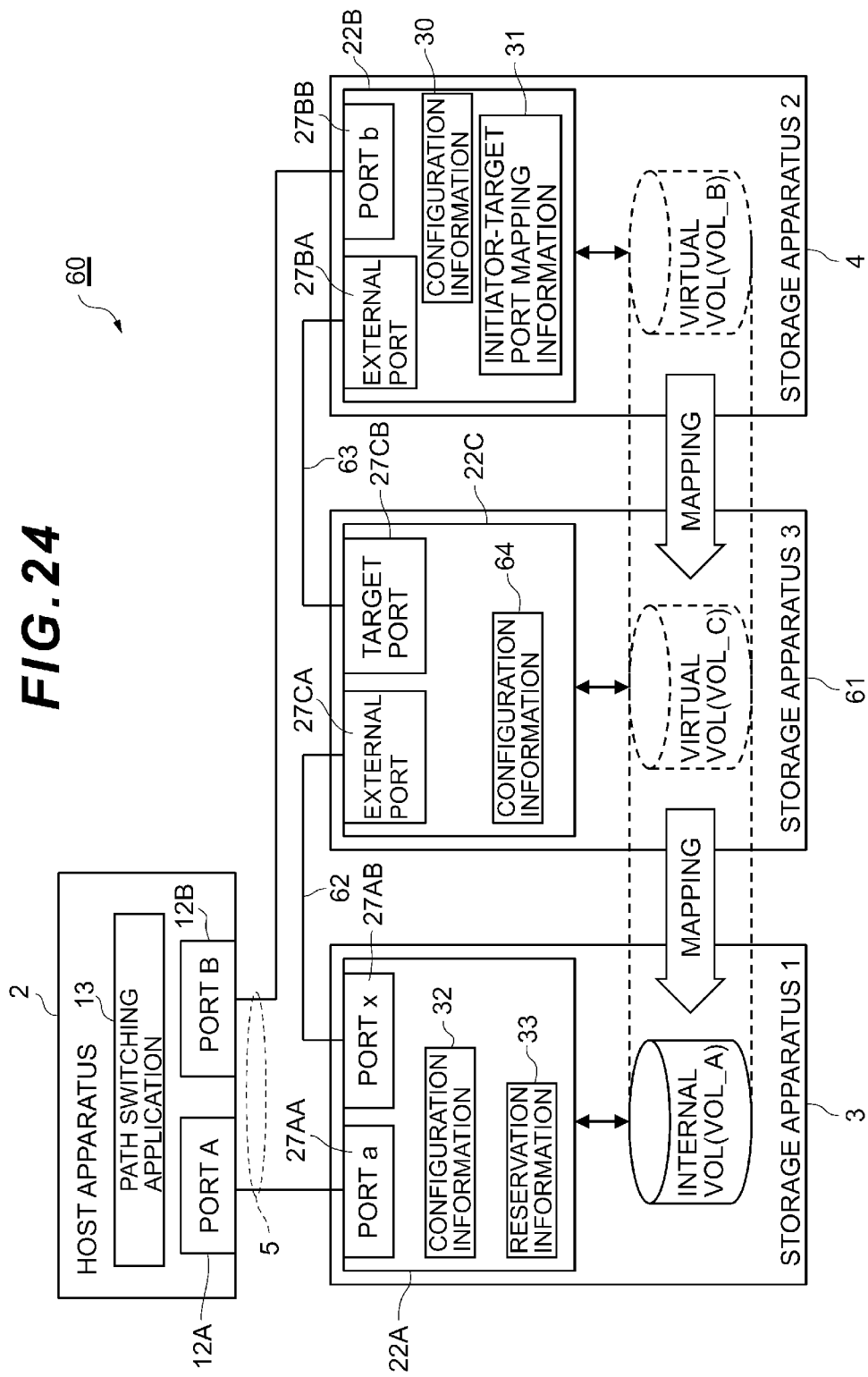
FIG. 24 is a block diagram showing the logical configuration of a computer system according to a second embodiment.

(2) Second Embodiment (2-1) Configuration of Computer System According to this Embodiment FIG. 24 which has the same reference numerals assigned to parts corresponding to those in FIG. 2 shows a computer system 60 according to a second embodiment. This computer system 60 comprises, in addition to the first storage apparatus 3 and second storage apparatus 4, a third storage apparatus 61 which has the aforementioned integrated management function and access restriction function installed.

The third storage apparatus 61 is a storage apparatus which has the same hardware configuration as the first storage apparatus 3 and second storage apparatus 4 and is connected to the first storage apparatus 3 and second storage apparatus 4 respectively via FC cables 62 and 63.

Configuration information 64 for managing logical volumes which are defined in the third storage apparatus 61 is provided in the shared memory (not shown) of the third storage apparatus 61. The configuration information 64 has the same configuration as the configuration information 30, 32 held by the first storage apparatus 3 and second storage apparatus 4 respectively.

In addition, a virtual volume VOL_C is defined in the third storage apparatus 61 and the virtual volume VOL_C is mapped to the logical volume VOL_A in the first storage apparatus 3 and the virtual volume VOL_B in the second storage apparatus 4 is mapped to the virtual volume VOL_C.

Accordingly, in this computer system 60, while the host apparatus 2 is able to directly access the logical volume VOL_A in the first storage apparatus 3, as a result of switching the path by means of the path switching application 13 of the host apparatus 2, it is also possible to access the logical volume VOL_A in the first storage apparatus 3 sequentially via the virtual volume VOL_B of the second storage apparatus 4 and the virtual volume VOL_C of the third storage apparatus 61.

(2-2) Various Processing of the Third Storage Apparatus Relating to the Access Restriction Function Each of the processes which are executed in the computer system 60 and relating to the foregoing access restriction function will be described next.

Figure 25:
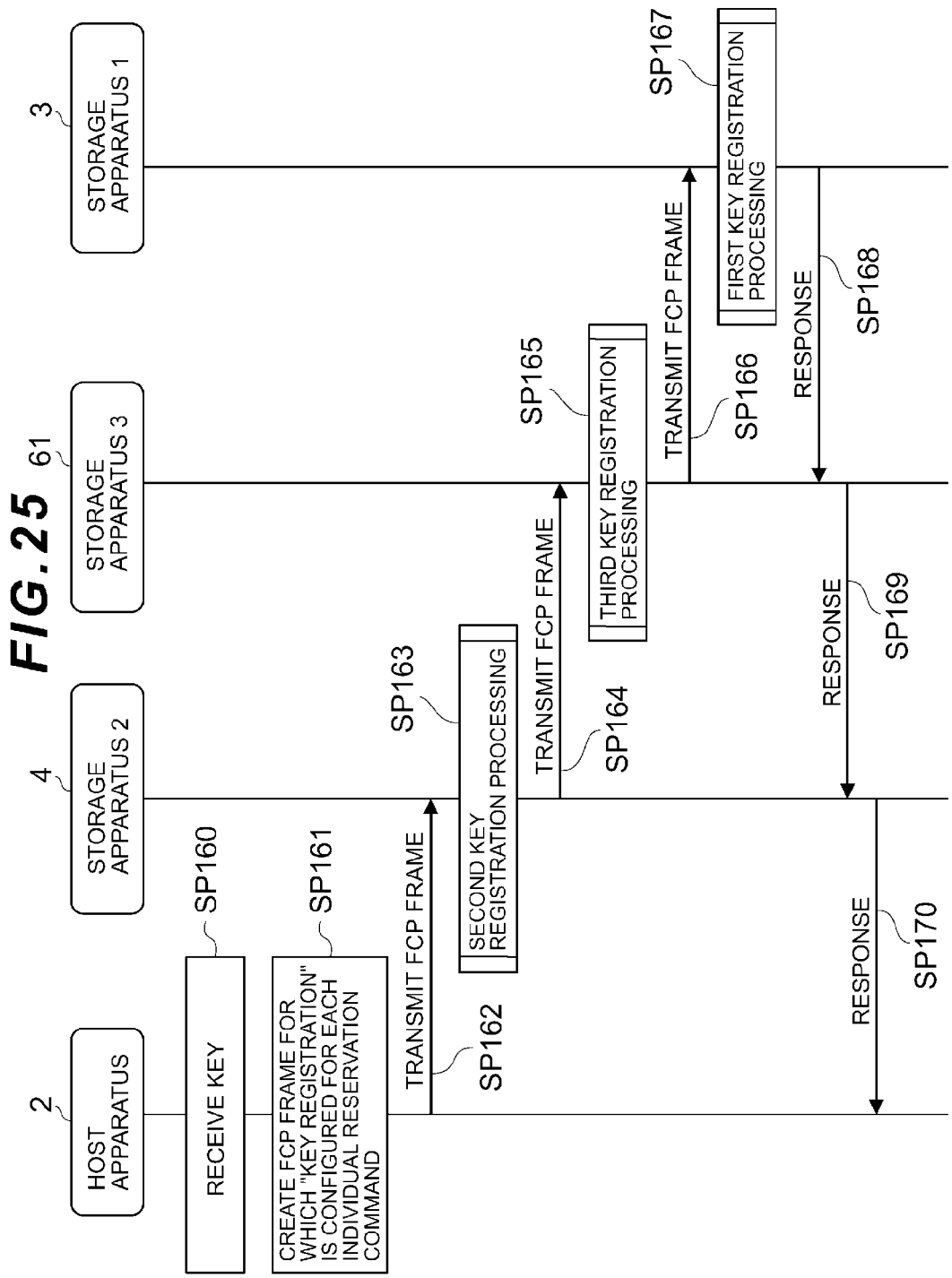
FIG. 25 is a sequence diagram serving to illustrate the flow of processes in a key registration phase of the second embodiment.

(2-2-1) Various Processing in Key Registration Phase (2-2-1-1) Flow of Processing in Key Registration Phase FIG. 25 shows the flow of a series of processes which are executed during the key registration phase (step SP1 in FIG. 6) of the computer system 60. Similarly to the first embodiment, this key registration phase is started as a result of the user using the host apparatus 2 to designate the volume number of the key registration target volume VOL_A in the first storage apparatus 3, and a key which is configured at this time.

Further, upon receiving this volume number and key, the host apparatus 2 (SP160), similarly to step SP11 in FIG. 7, creates an FCP frame 40 (FIG. 8) (SP161) which stores the key designated at this time, the host initiator WWN of the host apparatus 2, the initiator number and target number, and a reservation command 41 which contains a code that corresponds to the reservation command type such as "key registration," and the like, and transmits the FCP frame 40 thus created to the second storage apparatus 4 (SP162).

Upon receiving this FCP frame 40, similarly to step SP13 in FIG. 7, the second storage apparatus 4 registers required information such as the host initiator WWN, initiator number and target number and the like which are contained in the FCP frame 40 in the initiator target port-mapping information table 31 (FIG. 4). In addition, the second storage apparatus 4 stores the volume number of the key registration target volume VOL_A in the first storage apparatus 3 in the volume number field 40B, stores the initiator number and target number registered in the initiator target port-mapping information table 31 in the initiator number field 40C and target number field 40D respectively, and creates an FCP frame 40 obtained by storing as is the reservation command 41 contained in the FCP frame 40 from the host apparatus 2 in the SCSI command field 40F (SP163).

Furthermore, the second storage apparatus 4 transmits the FCP frame 40 thus created to the third storage apparatus 3 (SP164).

Upon receiving this FCP frame 40, the third storage apparatus 61 captures required information such as the initiator number and target number and the reservation command from the FCP frame 40, captures the volume number of the key registration target volume VOL_A from the configuration information 64 held by the storage apparatus 61 itself, and executes third key registration processing in which a new FCP frame 40 is created on the basis of this captured information (SP165). Furthermore, the third storage apparatus 61 transmits the created FCP frame 40 to the first storage apparatus 3 (SP166).

Upon receiving this FCP frame 40, the first storage apparatus 3 captures required information such as the key and host initiator WWN from the FCP frame 40 and executes first key registration processing in which this captured information is registered as the reservation information 33 (FIG. 5) of the key registration target volume VOL_A (SP167). The processing content of the first key registration processing is the same as the foregoing first key registration processing of the first embodiment of step SP15 in FIG. 7.

Furthermore, when the first key registration processing is complete, the first storage apparatus 3 transmits a response to that effect to the third storage apparatus 61 (SP168). Furthermore, upon receiving this response, the third storage apparatus 61 transfers the response to the second storage apparatus 4 (SP169) and, upon receiving this response, the second storage apparatus 4 transfers the response to the host apparatus 2 (SP170).

(2-2-1-2) Third key Registration Processing

Figure 26:
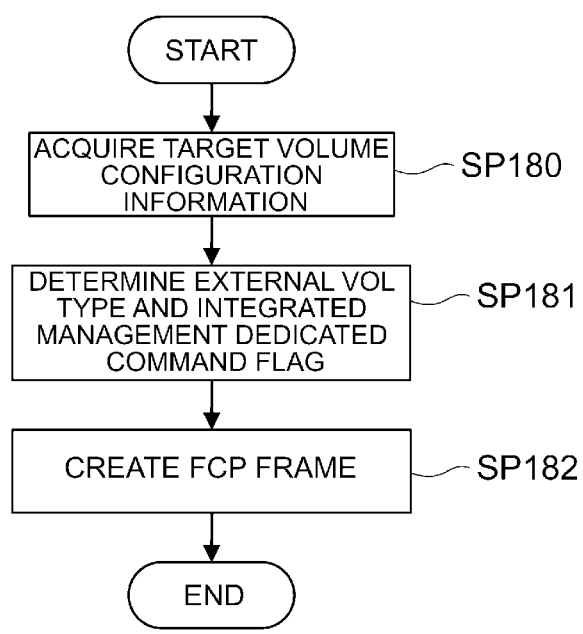
FIG. 26 is a flowchart showing a processing routine of third key registration processing.

Here, FIG. 26 shows the specific processing content of third key registration processing which is executed by the channel adapter 22C in the third storage apparatus 61 which receives the FCP frame 40 from the second storage apparatus 4 in step SP165 of the key registration phase.

Upon receiving the FCP frame 40 from the second storage apparatus 4, this channel adapter 22C starts the third key registration processing shown in FIG. 26, and first refers to the configuration information 64 (FIG. 24) stored in the shared memory (not shown) to acquire the external volume type of the logical volume which is targeted by the FCP frame 40 then received (here, the virtual volume VOL_C in the third storage apparatus 61 which is mapped to the key registration target volume VOL_A) (SP180).

Thereafter, the channel adapter 22C makes a determination of whether or not the external volume type acquired in step SP180 is "integrated management volume" and determines whether or not the value of the integrated management dedicated command flag in the FCP frame 40 is "1" (SP181).

Further, if a determination is obtained in step SP181 that the external volume type of the logical volume targeted by the FCP frame 40 is "integrated management volume" and that the value of the integrated management dedicated command flag in the FCP frame 40 is "1", the channel adapter 22C creates an FCP frame 40 for transmitting a reservation command 41 (FIG. 9) which is stored in the FCP frame 40 to the first storage apparatus 3 (SP182).

More specifically, the channel adapter 22C acquires the volume number of the logical volume (key registration target volume VOL_A) in the first storage apparatus 3 which is mapped to the logical volume (virtual volume VOL_C) targeted by the FCP frame 40 from the second storage apparatus 4 from the configuration information 64 (FIG. 24). Furthermore, the channel adapter 22C captures the initiator number and target number from the received FCP frame 40. The channel adapter then creates an FCP frame 40 which is obtained by storing the volume number of the key registration target volume VOL_A thus acquired together with the initiator number and target number in the volume number field 40B (FIG. 8), the initiator number field 40C (FIG. 8) and a target number field 40D (FIG. 8).

Here, the channel adapter 22C configures "1" for the integrated management dedicated command flag in the FCP frame 40. Furthermore, the channel adapter 22C stores as is the reservation command 41 contained in the FCP frame 40 from the second storage apparatus 4 in the SCSI command field 40F (FIG. 8).

Furthermore, the channel adapter 22C then terminates the third key registration processing. Accordingly, the FCP frame 40 which is thus created is subsequently transmitted to the first storage apparatus 3 in step SP166 of FIG. 25.

(2-2-2) Flow of Processing in Reservation Phase

Figure 27:
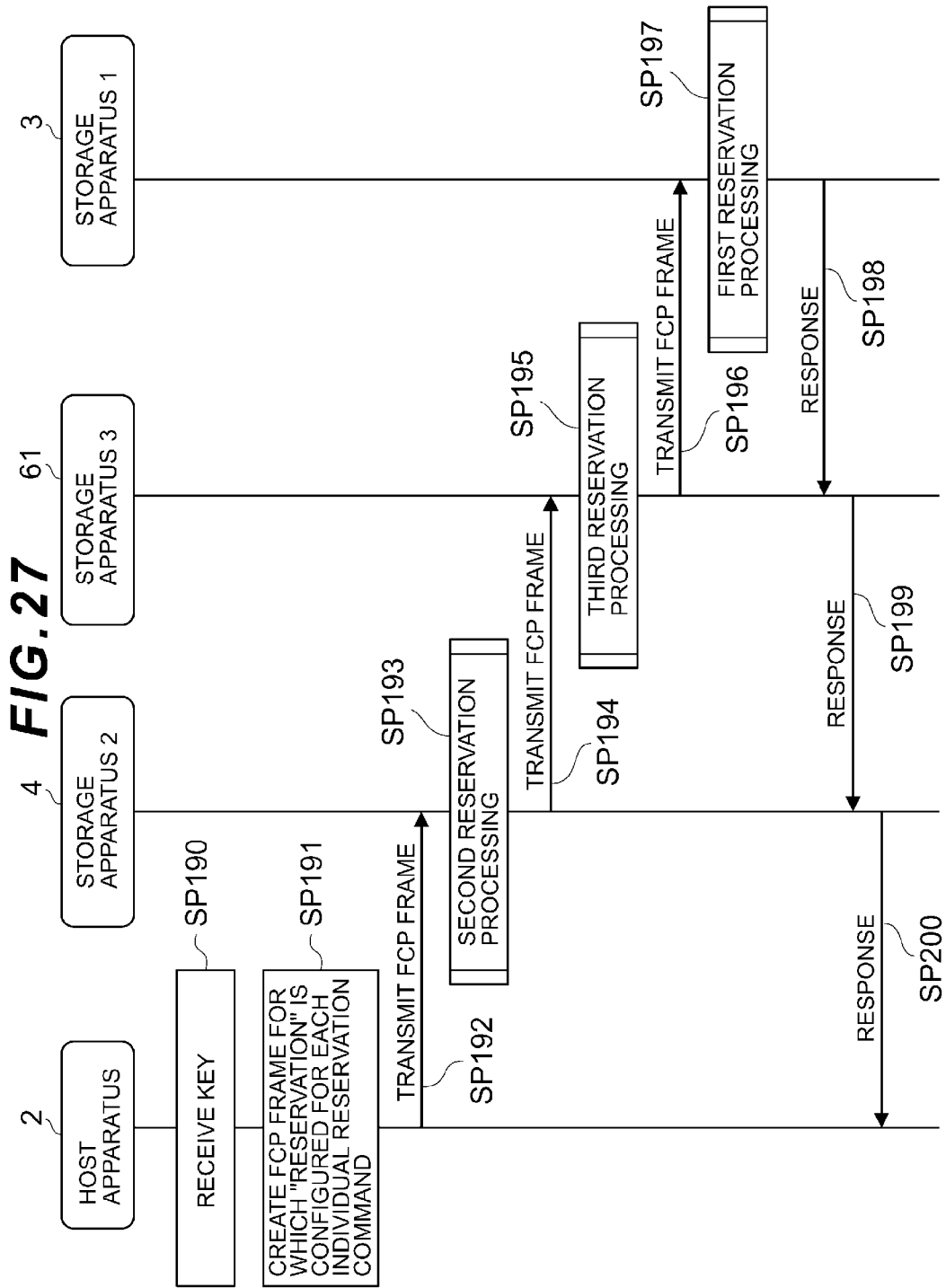
FIG. 27 is a sequence diagram serving to illustrate the flow of processes in a reservation cancelation phase of the second embodiment.

FIG. 27 shows the flow of the series of processes which are executed during the reservation phase of this computer system 60. As per the first embodiment, this reservation phase is started as a result of the user using the host apparatus 2 to designate the volume number of the reservation target volume VOL_A in the first storage apparatus 3, and a key which is pre-registered for the reservation target volume VOL_A.

Further, upon receiving this volume number and key (SP190), the host apparatus 2 creates an FCP frame 40 (SP191) to the effect that the reservation target volume VOL_A is to be reserved by means of the key designated at this time. Note that the specific processing content of the host apparatus 2 in step SP191 is the same as the aforementioned processing content for step SP41 in FIG. 12. The host apparatus 2 then transmits the FCP frame 40 thus created in step SP191 to the second storage apparatus 4 (SP192).

Upon receiving this FCP frame 40, the second storage apparatus 4 registers required information such as the host initiator WWN, initiator number and target number and the like which are contained in the FCP frame 40 in the initiator target port-mapping information table 31 (FIG. 4). In addition, the second storage apparatus 4 stores the volume number of the virtual volume VOL_C in the third storage apparatus 61 which is mapped to the reservation target volume VOL_A in the volume number field 40B, stores the initiator number and target number captured from the FCP frame 40 from the host apparatus 2 in the initiator number field 40C and target number field 40D respectively, configures "1" for the integrated management dedicated command flag and creates an FCP frame 40 obtained by storing as is the reservation command 41 acquired from the FCP frame 40 from the host apparatus 2 in the SCSI command field 40F (SP193). Note that the specific processing content of this step SP193 is the same as that of the aforementioned second reservation processing of step SP43 in FIG. 12.

Furthermore, the second storage apparatus 4 transmits the FCP frame 40 thus created to the third storage apparatus 61 (SP194).

Upon receiving this FCP frame 40, the third storage apparatus 61 captures required information such as the initiator number and target number and the reservation command 41 from the FCP frame 40, captures the volume number of the reservation target volume VOL_A from the configuration information 64, and executes third reservation processing in which a new FCP frame 40 is created on the basis of this captured information (SP195). The specific processing content of step SP195 is the same as that of the third key registration processing in FIG. 26 and hence a detailed description will be omitted. Furthermore, the third storage apparatus 61 transmits the FCP frame 40 thus created to the first storage apparatus 3 (SP196).

Upon receiving this FCP frame 40, the first storage apparatus 3 captures the reservation command 41 from the FCP frame 40 and executes first reservation processing in which the designated reservation target volume VOL_A is reserved for the host apparatus 2 on the basis of the captured reservation command 41 (SP197). The specific processing content of the first reservation processing is the same as the foregoing first reservation processing of step SP45 in FIG. 12.

Furthermore, when the first reservation processing is complete, the first storage apparatus 3 transmits a response to that effect to the third storage apparatus 61 (SP198). Furthermore, upon receiving this response, the third storage apparatus 61 transfers the response to the second storage apparatus 4 (SP199) and, upon receiving this response, the second storage apparatus 4 transfers the response to the host apparatus 2 (SP200).

Figure 28:
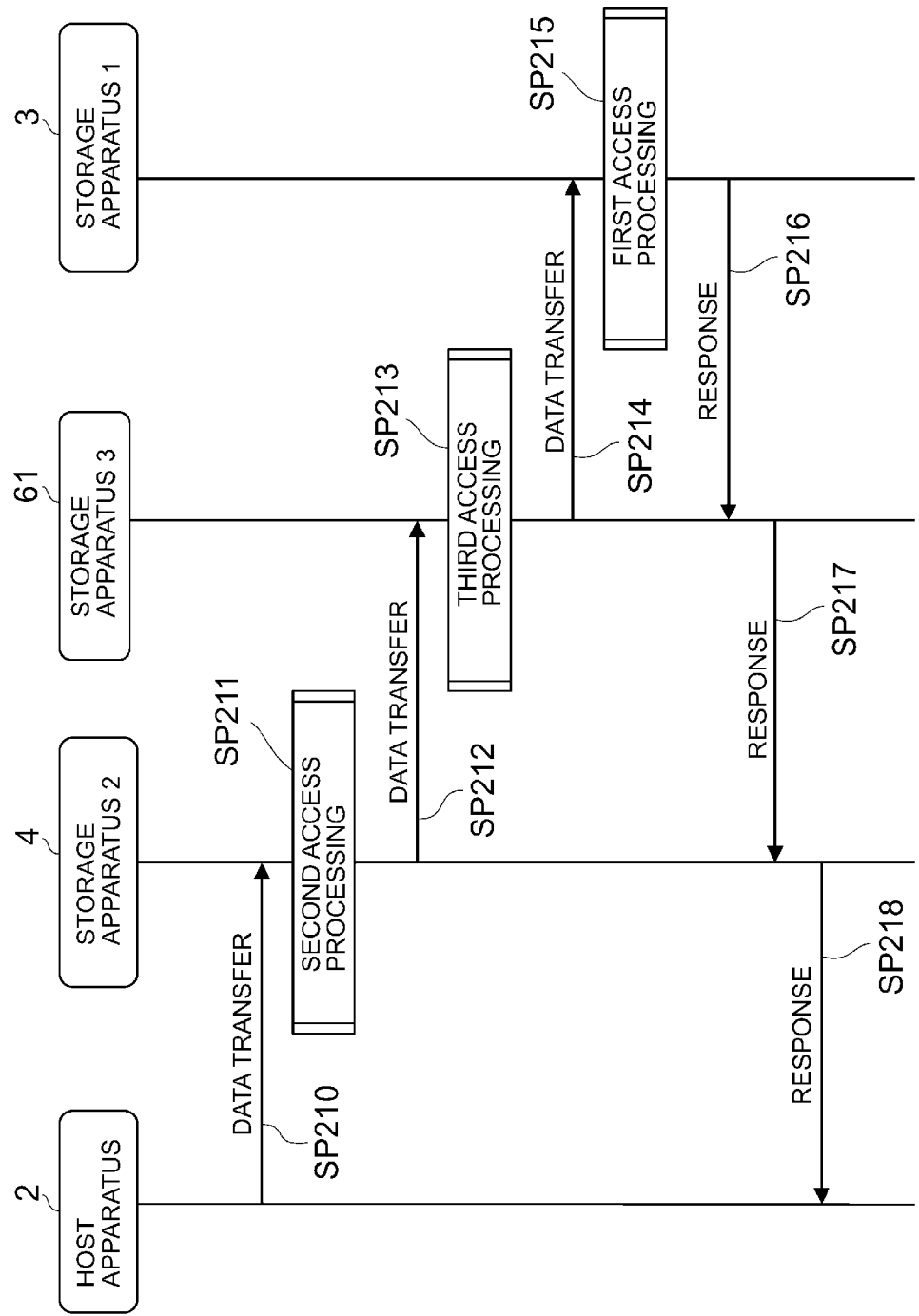
FIG. 28 is a sequence diagram serving to illustrate the flow of processes in a data transfer phase of the second embodiment.

(2-2-3) Various Processes in the Data Transfer Phase (2-2-3-1) Flow of Processing in Data Transfer Phase FIG. 28 shows the flow of processing during the data transfer phase of this embodiment. In this data transfer phase, the host apparatus 2 transmits an FCP frame 40 which is obtained by storing the SCSI access command (read command or write command) in the SCSI command field 40F (FIG. 8) to the second storage apparatus 4 (SP). Note that the content of the FCP frame 40 which is transmitted to the second storage apparatus 4 by the host apparatus 2 at this time is the same as that of the FCP frame 40 which is transmitted to the second storage apparatus 4 by the host apparatus 2 in step SP70 in FIG. 15.

Upon receiving this FCP frame 40, the second storage apparatus 4 registers the host initiator WWN, initiator number and target number which are contained in the FCP frame 40 in the initiator target port-mapping information table 31 (FIG. 4) together with the WWN (target WWN) of port 27BB of the second storage apparatus 4 which received the FCP frame 40 (SP211).

Furthermore, the second storage apparatus 4 stores the volume number of the access target volume VOL_A in the first storage apparatus 3 in the volume number field 40B, stores the initiator number and target number registered in the initiator target port-mapping information table 31 in the initiator number field 40C and target number field 40D respectively, and creates an FCP frame 40 which is obtained by storing as is the SCSI command contained in the FCP frame 40 from the host apparatus 2 in the SCSI command field 40F (SP211). The second storage apparatus 4 then transmits the FCP frame 40 thus created to the first storage apparatus 3 (SP212).

Upon receiving this FCP frame 40, the third storage apparatus 61 stores the volume number of the access target volume VOL_A in the first storage apparatus 3 in the volume number field 40B, stores the initiator number, target number, and SCSI command which are captured from the FCP frame 40 in the initiator number field 40C, target number field 40D, and SCSI command field 40F respectively, and executes third access processing in which an FCP frame, in which "1" is configured for the integrated management dedicated command flag, is created (SP213). The third storage apparatus 61 then transmits the FCP frame 40 thus created to the first storage apparatus 3 (SP214).

Upon receiving this FCP frame 40, the first storage apparatus 3 executes first access processing (read processing or write processing) according to an SCSI command which is contained in the FCP frame 40 (SP). The specific processing content of the first access processing is the same as that of the aforementioned first access processing of step SP73 in FIG. 15.

Further, when the first access processing is complete, the first storage apparatus 3 transmits a response to that effect to the third storage apparatus 61 (SP216). Upon receiving this response, the third storage apparatus 4 transfers the response to the second storage apparatus 4 (SP217) and, upon receiving the response, the second storage apparatus 4 transfers the response to the host apparatus 2 (SP218).

(2-2-3-2) Third Access Processing

Figure 29:
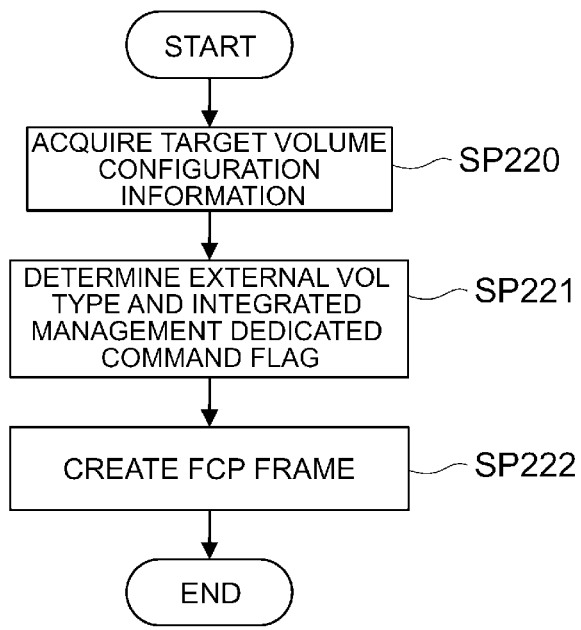
FIG. 29 is a flowchart showing a processing routine of third access processing.

Here, FIG. 29 shows specific processing content of third access processing which is executed by the channel adapter 22C (FIG. 24) in the third storage apparatus 61 which received the FCP frame 40 from the second storage apparatus 4 in step SP213 of the data transfer phase.

Upon receiving the FCP frame 40 from the second storage apparatus 4, this channel adapter 22C starts the third access processing shown in FIG. 29, and first refers to the configuration information 64 (FIG. 24) stored in the shared memory (not shown) to acquire the external volume type of the logical volume which is targeted by the FCP frame 40 then received (here, the virtual volume VOL_C in the third storage apparatus 61 which is mapped to the access target volume VOL_A) (SP220).

Thereafter, the channel adapter 22C makes a determination of whether or not the external volume type acquired in step SP220 is "integrated management volume" and determines whether or not the value of the integrated management dedicated command flag in the FCP frame 40 is "1" (SP221).

Further, if a determination is obtained in step SP221 that the external volume type of the logical volume targeted by the FCP frame 40 is "integrated management volume" and that the value of the integrated management dedicated command flag in the FCP frame 40 is "1", the channel adapter 22C creates an FCP frame 40 for transmitting an SCSI command which is stored in the FCP frame 40 to the first storage apparatus 3 (SP222).

More specifically, the channel adapter 22C acquires the volume number of the logical volume (access target volume VOL_A) in the first storage apparatus 3 which is mapped to the logical volume (virtual volume VOL_C) targeted by the FCP frame 40 from the second storage apparatus 4 from the configuration information 64. Furthermore, the channel adapter 22C captures the initiator number and target number from the FCP frame 40. The channel adapter 22C then creates an FCP frame 40 which is obtained by storing the volume number of the access target volume VOL_A thus acquired together with the initiator number and target number in the volume number field 40B, the initiator number field 40C, and the target number field 40D respectively.

Here, the channel adapter configures "1" for the integrated management dedicated command flag in the created FCP frame, and stores the SCSI command contained in the FCP frame 40 from the host apparatus 2 in the SCSI command field 40F.

Furthermore, the channel adapter 22C then terminates the third access processing. Accordingly, the FCP frame 40 which is thus created is subsequently transmitted to the first storage apparatus 3 in step SP214 of FIG. 28.

(2-2-4) Flow of Processing in Reservation Cancelation Phase

FIG. 30 shows the flow of a series of processes which are executed during reservation cancelation phase of the computer system 60. Similarly to the first embodiment, the reservation cancelation phase is started as a result of the user using the host apparatus 2 to designate the volume number of the reservation cancelation target volume VOL_A in the first storage apparatus 3 and a key which is pre-registered for the reservation cancelation target volume VOL_A.

In addition, upon receiving this volume number and key (SP230), the host apparatus 2 creates an FCP volume 40 to the effect that the reserved state of the reservation cancelation target volume VOL_A is to be canceled by means of the key designated at this time (SP231). Note that specific processing content of the host apparatus 2 in step SP230 is the same as the aforementioned processing content of step SP101 in FIG. 18. The host apparatus 2 then transmits the FCP frame 40 thus created to the second storage apparatus 4 (SP232).

Upon receiving this FCP frame 40, the second storage apparatus 4 registers required information, such as the host initiator WWN, the initiator number and the target number which are contained in the FCP frame 40, in the initiator target port-mapping information table 31 (FIG. 4). Furthermore, the second storage apparatus 4 stores the volume number of the virtual volume VOL_C in the third storage apparatus 3 which is mapped to the reservation cancelation target volume VOL_A in the volume number field 40B, stores the initiator number and target number captured from the FCP frame 40 from the host apparatus 2 in the initiator number field 40C and target number field 40D respectively, configures "1" for the integrated management dedicated command flag and creates an FCP frame 40 obtained by storing as is the reservation command 41 acquired from the FCP frame 40 from the host apparatus 2 in the SCSI command field 40F (SP233). Note that the specific processing content of this step SP233 is the same as that of the aforementioned second reservation cancelation processing of step SP103 in FIG. 18.

Furthermore, the second storage apparatus 4 transmits the FCP frame 40 thus created to the third storage apparatus 61 (SP234).

Upon receiving this FCP frame 40, the third storage apparatus 61 captures required information such as the initiator number and target number and the reservation command 41 from the FCP frame 40, captures the volume number of the reservation cancelation target volume VOL_A from the configuration information 64, and executes third reservation cancelation processing in which a new FCP frame 40 is created on the basis of this captured information (SP235). The specific processing content of step SP235 is the same as that of the third key registration processing in FIG. 26 and hence a detailed description will be omitted. Furthermore, the third storage apparatus 61 transmits the FCP frame 40 thus created to the first storage apparatus 3 (SP236).

Upon receiving this FCP frame 40, the first storage apparatus 3 captures the reservation command 41 from the FCP frame 40 and executes first reservation cancelation processing in which the reserved state of the reservation cancelation target volume VOL_A is canceled on the basis of the captured information (SP237). The specific processing content of the first reservation cancelation processing is the same as the foregoing first reservation cancelation processing of FIG. 18.

Furthermore, when the first reservation cancelation processing is complete, the first storage apparatus 3 transmits a response to that effect to the third storage apparatus 61 (SP238). Furthermore, upon receiving this response, the third storage apparatus 61 transfers the response to the second storage apparatus 4 (SP239) and, upon receiving this response, the second storage apparatus 4 transfers the response to the host apparatus 2 (SP240).

(2-5) Effect of the Embodiment

As mentioned earlier, in a computer system 60 according to this embodiment, even in cases where the virtual volume VOL_B in the second storage apparatus 4 is mapped to the logical volume VOL_A in the first storage apparatus 3 via the virtual volume VOL_C in the third storage apparatus 61, as per the computer system 1 according to the first embodiment, access restrictions can be imposed so that only the host apparatus 2 which reserved the logical volume VOL_A in the first storage apparatus 3 is able to access the logical volume VOL_A. It is thus possible to gradually improve the security and reliability of the computer system 60.

(3) Further Embodiments

Note that, although a case was described in the foregoing embodiments in which the first storage apparatus 3 and second storage apparatus 4 are configured as shown in FIG. 1, the present invention is not limited to such a case, rather, a variety of other configurations can also be applied for the configuration of the first storage apparatus 3 and second storage apparatus 4.

Furthermore, in the foregoing first and second embodiments, a case was described where, as path information for the path connecting the host apparatus 2 to the virtual volume VOL_B in the second storage apparatus 4, an initiator number which is calculated on the basis of the WWN of port 27BB of the host apparatus 2 used for communications with the second storage apparatus 4 of the host apparatus 2, and a target number which is calculated on the basis of the WWN of port 27BB of the second storage apparatus 4 used for communications with the host apparatus 2 of the second storage apparatus 4 are applied, but the present invention is not limited to this case, rather, other information may also be applied as this path information.

INDUSTRIAL APPLICABILITY

The present invention is widely applicable to computer systems which adopt an access restriction technology whereby a host apparatus pre-reserves a logical volume in a storage apparatus when accessing the logical volume.

REFERENCE SIGNS LIST

1, 60 Computer system
2 Host apparatus
3, 4, 61 Storage apparatus
8 Management terminal
22A to 22C Channel adapter
12A, 12B, 27AA, 27AB, 27BA to 27BC, 27CA, 27CB Port
30, 32, 64 Configuration information
31 Initiator target port-mapping information table
33, 50 Reverse information
40 FCP frame
41 Reverse command
VOL, VOL_A to VOL_D Volume

The invention claimed is:

1. A computer system, comprising:

a first storage apparatus which provides a first logical volume from/to which a host apparatus reads and writes data; and a second storage apparatus that includes an external connection function which provides a second logical volume obtained by virtualizing the first logical volume of the first storage apparatus, to the host apparatus and provides a third logical volume, wherein the second storage apparatus is configured to copy data from the second logical volume to the third logical volume as receiving an access request to the second logical volume, the first logical volume being reserved when the host apparatus accesses the first logical volume, wherein the second storage apparatus:

receives a first registration-target key from the host apparatus, transmits, to the first storage apparatus, a first command containing the first registration-target key, and first path information, which relates to a path from the host apparatus to the second logical volume, in response to a key registration request from the host apparatus to the effect that a key is to be registered for the second logical volume, receives a reservation request that includes a second key from the host apparatus, transmits, to the first storage apparatus, a second command containing the second key, and second path information to reserve the second logical volume, which relates to a path from the host apparatus to the second logical volume, in response to the reservation request from the host apparatus to the effect that the second logical volume is to be reserved, and transmits, from the second storage apparatus to the first storage apparatus, a third command containing third path information, which relates to a path from the host apparatus to the second logical volume, in response to an access request for access to the second logical volume from the host apparatus, and wherein the first storage apparatus:

upon receiving the first command, stores the first key and the first path information contained in the first command as reservation information in association with the first key registration-target logical volume, upon receiving the second command, compares the first key and the first path information, which are contained in reservation information stored in association with the first logical volume which is a reservation target, with the second key and the second path information which are contained in the second command and, when there is a match between the first key and the first path information and the second key and the second path information, reserves the first logical volume for use by the host apparatus, and, upon receiving the third command, compares the first path information, which is contained in the reservation information stored in association with the first logical volume which is an access target, with the third path information which is contained in the third command and, when there is a match between the first and third path information, access from the host apparatus is granted via the second storage apparatus, wherein the second storage apparatus is configured to transmit a fourth command that corresponds to the reservation cancellation request to the first storage apparatus in response to a mapping cancellation request, upon receiving the fourth command, the first storage apparatus is configured to transmit the corresponding reservation information stored for the corresponding first logical volume to the second logical volume, wherein the second storage apparatus is configured to rewrite the reservation information transmitted by the first storage apparatus, and wherein the second storage apparatus is configured to process the access restrictions using the rewritten reservation information.

2. The computer system according to claim 1, wherein the second storage apparatus transmits, to the first storage apparatus, a fourth command containing a third key, which is supplied by the host apparatus, and fourth path information, which relates to a path from the host apparatus to the second logical volume, in response to a reservation cancellation request from the host apparatus to the effect that reservation of the second logical volume is to be canceled, and wherein the first storage apparatus, upon receiving the fourth command, compares the first key and the first path information, which are contained in the reservation information stored in association with the first logical volume which is a reservation cancellation target, with the third key and the fourth path information which are contained in the fourth command and, when there is a match between the first key and the first path information, and the third key and the fourth path information, cancels the reservation of the first logical volume.

3. The computer system according to claim 1, wherein the first and third path information contain at least:

an initiator number which is calculated on the basis of the address of the port of the host apparatus which is used when the host apparatus communicates with the second storage apparatus; and a target number which is calculated on the basis of the address of the port of the second storage which is used when the second storage apparatus communicates with the host apparatus.

4. An access restriction method of a computer system which comprises a first storage apparatus which provides a first logical volume from/to which a host apparatus reads and writes data, and a second storage apparatus that includes an external connection function which provides a second logical volume obtained by virtualizing the first logical volume of the first storage apparatus, to the host apparatus and provides a third logical volume, wherein the second storage apparatus is configured to copy data from the second logical volume to the third logical volume as receiving an access request to the second logical volume, the first logical volume being reserved when the host apparatus accesses the first logical volume, the access restriction method comprising:

receiving, by the second storage apparatus, a key registration request that includes a first registration-target key from the host apparatus, transmitting, by the second storage apparatus to the first storage apparatus, in response to the key registration request from the host apparatus to the effect that a key is to be registered for the second logical volume, a first command containing the first registration-target key, and first path information, which relates to a path from the host apparatus to the second logical volume and, upon receiving the first command, the first storage apparatus stores the first key and the first path information contained in the first command as reservation information in association with the first key registration-target logical volume;

receiving a reservation request that includes a second key from the host apparatus;

transmitting, by the second storage apparatus to the first storage apparatus, in response to the reservation request from the host apparatus to the effect that the second logical volume is to be reserved, a second command containing a second key, which is supplied by the host apparatus, and second path information to reserve the second logical volume, which relates to a path from the host apparatus to the second logical volume and, upon receiving the second command, compares the first key and the first path information, which are contained in reservation information stored in association with the first logical volume which is a reservation target, with the second key and the second path information which are contained in the second command and, when there is a match between the first key and the first path information and the second key and the second path information, reserves the first logical volume for use by the host apparatus; and transmitting, by the second storage apparatus to the first storage apparatus, in response to an access request for access to the second logical volume from the host apparatus, a third command containing third path information which relates to a path from the host apparatus to the second logical volume and, upon receiving the third command, the first storage apparatus compares the first path information, which is contained in the reservation information stored in association with the first logical volume which is an access target, with the third path information which is contained in the third command and, when there is a match between the first and third path information, granting access from the host apparatus via the second storage apparatus, transmitting, by the second storage apparatus, a fourth command that corresponds to the reservation cancellation request to the first storage apparatus in response to a mapping cancellation request, receiving, at the first storage apparatus, the fourth command, transmitting, by the first storage apparatus, the corresponding reservation information stored for the corresponding first logical volume to the second logical volume, rewriting, by the second storage apparatus, the reservation information transmitted by the first storage apparatus, and processing, by the second storage apparatus, the access restrictions using the rewritten reservation information.

5. The access restriction method according to claim 4, wherein, in response to a reservation cancellation request from the host apparatus to the effect that the reservation of the second logical volume is to be canceled, the second storage apparatus transmits, to the first storage apparatus, a fourth command containing a third key, which is supplied by the host apparatus, and fourth path information, which relates to a path from the host apparatus to the second logical volume, and wherein the first storage apparatus, upon receiving the fourth command, compares the first key and the first path information, which are contained in the reservation information stored in association with the first logical volume which is a reservation cancellation target, with the third key and the fourth path information which are contained in the fourth command and, when there is a match between the first key and the first path information, and the third key and the fourth path information, cancels the reservation of the first logical volume.

6. The access restriction method according to claim 4, wherein the first and third path information contain at least:
an initiator number which is calculated on the basis of the address of the port of the host apparatus which is used when the host apparatus communicates with the second storage apparatus; and
a target number which is calculated on the basis of the address of the port of the second storage which is used when the second storage apparatus communicates with the host apparatus.

\* \* \* \* \*